US012769997B2

(12) United States Patent
Klein et al.

(10) Patent No.: US 12,769,997 B2
(45) Date of Patent: Oct. 20, 2026

(54) DEEP LEARNING OPTIMIZED ITERATIVE PROCESS WITH APPLICATION TO THE OPTIMIZATION OF LAYERED BELIEF PROPAGATION FOR LOW DENSITY PARITY CHECK DECODING

(71) Applicant: QUALCOMM Incorporated, San Diego, CA (US)

(72) Inventors: Aaron Klein, Highland Park, NJ (US); Vincent Loncke, Piscataway, NJ (US); Benjamin Tang, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 1022 days.

(21) Appl. No.: 17/477,421

(22) Filed: Sep. 16, 2021

(65) Prior Publication Data

US 2022/0083860 A1 Mar. 17, 2022

Related U.S. Application Data

(60) Provisional application No. 63/079,751, filed on Sep. 17, 2020.

(51) Int. Cl.
*G06N 3/08* (2023.01)
*G06N 3/048* (2023.01)

(52) U.S. Cl.
CPC ............... *G06N 3/08* (2013.01); *G06N 3/048* (2023.01)

(58) Field of Classification Search
CPC ............ G06N 3/08; G06N 3/048; G06N 5/01; G06N 7/01; G06N 3/04; G06N 20/00;
(Continued)

(56) References Cited

U.S. PATENT DOCUMENTS

| | | | |
|---|---|---|---|
| 8,190,962 | B1 | 5/2012 | Chen |
| 10,972,217 | B2 | 4/2021 | Wang et al. |

(Continued)

FOREIGN PATENT DOCUMENTS

| | | | |
|---|---|---|---|
| CN | 109302267 | A | 2/2019 |
| CN | 109361491 | A | 2/2019 |
| CN | 110730008 | A | 1/2020 |

OTHER PUBLICATIONS

Buchberger A, Häger C, Pfister HD, Schmalen L. Pruning Neural Belief Propagation Decoders. arXiv preprint arXiv:2001.07464. Jan. 21, 2020. (Year: 2020).*

(Continued)

*Primary Examiner* — Kc Chen
(74) *Attorney, Agent, or Firm* — QUALCOMM Incorporated

(57) ABSTRACT

A method of optimizing an iterative process defines a set of trainable parameters and a differentiable gating function to be applied to each parameter in the set of trainable parameters. A trainable model of the iterative process is built, wherein the iterative process is modified by using the value of the differentiable gating function applied to the parameters to compute a weighted sum of internal variables of the iterative process before and after each iteration. A machine learning-based optimization of the trainable model of the iterative process determines a subset of iterations of the iterative process to perform. The subset of iterations is determined such that an accuracy and a number of active iterations of the iterative process are jointly optimized. The method processes only the subset of the iterations to perform the iterative process. The method is applied to optimize the layered belief propagation algorithm for LDPC decoding.

27 Claims, 9 Drawing Sheets

(58) Field of Classification Search
CPC .................. G06N 3/0499; G06N 3/09; H03M 13/1128; H03M 13/114; H03M 13/1111; H03M 13/116
See application file for complete search history.

(56) References Cited

U.S. PATENT DOCUMENTS

| | | | | |
|---|---|---|---|---|
| 2011/0179333 | A1* | 7/2011 | Wesel | H03M 13/1111 714/752 |
| 2018/0357530 | A1* | 12/2018 | Beery | H04L 1/0045 |
| 2019/0305882 | A1 | 10/2019 | Wang et al. | |
| 2022/0029637 | A1* | 1/2022 | Jeon | H03M 13/618 |

OTHER PUBLICATIONS

3GPP: "3rd Generation Partnership Project, Technical Specification Group Radio Access Network, NR, Multiplexing and Channel Coding (Release 16)", 3GPP TS 38.212 V16.2.0, Jun. 2020, pp. 1-151.

Abadi M., et al., "TensorFlow: A System for Large-Scale Machine Learning", USENIX Association, 12th USENIX Symposium on Operating Systems Design and Implementation, Savannah, GA, USA, Nov. 2, 2016-Nov. 4, 2016, pp. 265-283.

Fossorier M.P.C, et al., "Reduced Complexity Iterative Decoding of Low-Density Parity Check Codes Based on Belief Propagation", IEEE Transactions on Communications, vol. 47, No. 5, May 1999, pp. 673-680.

Gallager R.G., "Low-density Parity-check Codes", IRE Transactions on Information Theory, IEEE, USA, Jan. 1, 1962 , vol. 1, No. 1, pp. 21-28.

Hocevar D.E., "A Reduced Complexity Decoder Architecture via Layered Decoding of LDPC Codes", IEEE Workshop on Signal Processing Systems, SIPS 2004, Oct. 13, 2004-Oct. 15, 2004, pp. 107-112.

Lugosch L., et al., "Neural Offset Min-Sum Decoding", arXiv:1701.05931v3 [cs.IT], Jul. 27, 2017, 5 Pages.

Nachmani E., et al., "Learning to Decode Linear Codes Using Deep Learning", arXiv:1607.04793v2 [cs.IT], Sep. 30, 2016, 6 Pages.

Perahia E., et al., "Next Generation Wireless LANs: 802.11n and 802.11ac", 2nd Edition, Cambridge University Press, Cambridge, UK, Jun. 2013, 28 Pages.

Richardson T., et al., "Modern Coding Theory", Cambridge University Press, New York, 2008, 13 Pages.

Shannon C.E., "A Mathematical Theory of Communication", The Bell System Technical Journal, vol. 27, pp. 379-423, 623-656, July, Oct. 1948, pp. 1-55.

Tanner R.M., "A Recursive Approach to Low Complexity Codes", IEEE Transactions on Information Theory, vol. IT-27, No. 5, Sep. 1981, pp. 533-547.

Abotabl A., et al., "Offset Min-Sum Optimization for General Decoding Scheduling: A Deep Learning Approach", 2019 IEEE 90th Vehicular Technology Conference (VTC2019-Fall), IEEE, Sep. 22, 2019 (Sep. 22, 2019), pp. 1-5, DOI: 10.1109/VTCFALL.2019.8891434 [retrieved on Nov. 4, 2019].

Cheng C., et al., "Left-Right Skip-DenseNets for Coarse-to-Fine Object Categorization", arxiv.org, Cornell University Library, 201 Olin Library Cornell University Ithaca, NY 14853, Oct. 28, 2011, (Oct. 28, 2011), XP80832502A, 8 Pages.

International Search Report and Written Opinion—PCT/US2021/050926—ISA/EPO—Jan. 7, 2022.

Zhang, J., et al., "Check-node Lazy Scheduling Approach for Layered Belief Propagation Decoding Algorithm," Electronics Letters, IEE Stevenage, GB, vol. 50 (4), Feb. 13, 2014, pp. 278-279.

* cited by examiner

DEEP LEARNING OPTIMIZED ITERATIVE PROCESS WITH APPLICATION TO THE OPTIMIZATION OF LAYERED BELIEF PROPAGATION FOR LOW DENSITY PARITY CHECK DECODING

CROSS-REFERENCE TO RELATED APPLICATION

The present application claims the benefit of U.S. Provisional Patent Application No. 63/079,751, filed on Sep. 17, 2020, and titled "DEEP LEARNING OPTIMIZED ITERATIVE PROCESS WITH APPLICATION TO THE OPTIMIZATION OF LAYERED BELIEF PROPAGATION FOR LOW DENSITY PARITY CHECK DECODING," the disclosure of which is expressly incorporated by reference in its entirety.

FIELD OF THE DISCLOSURE

Aspects of the present disclosure generally relate to wireless communications, and more particularly to techniques and apparatuses for a deep learning optimized iterative process, such as partial-iteration low density parity check (LDPC) decoding.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, long term evolution (LTE) and 5G New Radio (NR).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Supervised machine learning comprises a set of techniques for using data to optimize the parameters of a model, and then using the optimized model to process new data. For example, machine learning can be used to automatically detect patterns in data and use such patterns to make predictions regarding future data. It would be desirable to apply machine learning to computing and communications to improve the accuracy of communicated information and to reduce computational complexity and cost.

SUMMARY

The present disclosure is set forth in the independent claims, respectively. Some aspects of the disclosure are described in the dependent claims.

In an aspect of the present disclosure, a method of optimizing an iterative process is provided. The method includes defining a set of trainable parameters and defining a differentiable gating function to be applied to each parameter in the set of trainable parameters. The method also includes building a trainable model of the iterative process, in which the iterative process is modified by using the value of the differentiable gating function applied to the parameters to compute a weighted sum of internal variables of the iterative process before and after each iteration. The method additionally includes determining, via machine learning-based optimization of the trainable model of the iterative process, a subset of iterations of the iterative process to perform. The subset of iterations is determined such that an accuracy and a number of active iterations of the iterative process are jointly optimized. The method further includes processing only the optimized subset of the iterations to perform the iterative process.

In another aspect, a method of optimizing an iterative process is provided. The method includes determining, via a machine learning-based optimization, a subset of iterations of the iterative process to perform. The subset of iterations is determined such that an accuracy and a number of active iterations of the iterative process are jointly optimized. The method also includes processing only the subset of the iterations to perform the iterative process.

In another aspect of the present disclosure, a method optimizing a layered belief propagation (LBP) algorithm for low density parity check (LDPC) decoding is provided. The method includes defining a set of trainable parameters and defining a differentiable gating function to be applied to each parameter in the set of trainable parameters. The method also includes building a trainable model of the LBP algorithm, in which the value of the differentiable gating function applied to the parameters is used to compute a weighted sum of check node messages corresponding to a current LDPC decoder iteration and a previous LDPC decoder iteration. The method additionally includes determining, via machine learning-based optimization of the trainable model of the LBP algorithm, a subset of layers to process in each LDPC decoder iteration. The subset of layers is determined such that a decoding accuracy and a number of active layers are jointly optimized. The method further includes processing only the subset of layers in each LDPC decoder iteration.

In another aspect of the present disclosure, an apparatus for optimizing an iterative process is provided. The apparatus includes a memory and one or more processors coupled to the memory. The processor(s) are configured to define a set of trainable parameters and define a differentiable gating function to be applied to each parameter in the set of trainable parameters. The processor(s) are also configured to build a trainable model of the iterative process, in which the iterative process is modified by using the value of the differentiable gating function applied to the parameters to compute a weighted sum of internal variables of the iterative process before and after each iteration. In addition, the processor(s) are configured to determine, via machine learning-based optimization of the trainable model of the iterative process, a subset of iterations of the iterative process to perform. The subset of iterations is determined such that an accuracy and a number of active iterations of the iterative process are jointly optimized. Further, the processor(s) are configured to process only the optimized subset of the iterations to perform the iterative process.

In another aspect of the present disclosure, an apparatus for optimizing an iterative process is provided. The apparatus includes a memory and one or more processors coupled to the memory. The processor(s) are configured to determine, via a machine learning-based optimization, a subset of iterations of the iterative process to perform. The subset of iterations is determined such that an accuracy and a number of active iterations of the iterative process are jointly optimized. The processor(s) are also configured to process only the subset of the iterations to perform the iterative process.

In another aspect of the present disclosure, an apparatus for optimizing a LBP algorithm for LDPC decoding is provided. The apparatus includes a memory and one or more processors coupled to the memory. The processor(s) are configured to define a set of trainable parameters and a differentiable gating function to be applied to each parameter in the set of trainable parameters. The processor(s) are also configured to build a trainable model of the LBP algorithm, in which the value of the differentiable gating function applied to the parameters is used to compute a weighted sum of check node messages corresponding to a current LDPC decoder iteration and a previous LDPC decoder iteration. In addition, the processor(s) are configured to determine, via machine learning-based optimization of the trainable model of the LBP algorithm, a subset of layers to process in each LDPC decoder iteration. The subset of layers is determined such that a decoding accuracy and a number of active layers are jointly optimized. Further, the processor(s) are configured to process only the optimized subset of layers in each LDPC decoder iteration.

In an aspect of the present disclosure, an apparatus for optimizing an iterative process is provided. The apparatus includes means for defining a set of trainable parameters and defining a differentiable gating function to be applied to each parameter in the set of trainable parameters. The apparatus also includes means for building a trainable model of the iterative process, in which the iterative process is modified by using the value of the differentiable gating function applied to the parameters to compute a weighted sum of internal variables of the iterative process before and after each iteration. The apparatus additionally includes means for determining, via machine learning-based optimization of the trainable model of the iterative process, a subset of iterations of the iterative process to perform. The subset of iterations is determined such that an accuracy and a number of active iterations of the iterative process are jointly optimized. The apparatus further includes means for processing only the optimized subset of the iterations to perform the iterative process.

In another aspect, an apparatus for optimizing an iterative process is provided. The apparatus includes means for determining, via a machine learning-based optimization, a subset of iterations of the iterative process to perform. The subset of iterations is determined such that an accuracy and a number of active iterations of the iterative process are jointly optimized. The apparatus also includes means for processing only the subset of the iterations to perform the iterative process.

In another aspect of the present disclosure, an apparatus optimizing a LBP algorithm for LDPC decoding is provided. The apparatus includes means for defining a set of trainable parameters and defining a differentiable gating function to be applied to each parameter in the set of trainable parameters. The apparatus also includes means for building a trainable model of the LBP algorithm, in which the value of the differentiable gating function applied to the parameters is used to compute a weighted sum of check node messages corresponding to a current LDPC decoder iteration and a previous LDPC decoder iteration. The apparatus additionally includes means for determining, via machine learning-based optimization of the trainable model of the LBP algorithm, a subset of layers to process in each LDPC decoder iteration. The subset of layers is determined such that a decoding accuracy and a number of active layers are jointly optimized. The apparatus further includes means for processing only the subset of layers in each LDPC decoder iteration.

In another aspect of the present disclosure, a non-transitory computer readable medium is provided. The computer readable medium has encoded thereon program code for optimizing an iterative process. The program code is executed by a processor and includes code to define a set of trainable parameters and define a differentiable gating function to be applied to each parameter in the set of trainable parameters. The program code includes code to build a trainable model of the iterative process, in which the iterative process is modified by using the value of the differentiable gating function applied to the parameters to compute a weighted sum of internal variables of the iterative process before and after each iteration. In addition, the program code includes code to determine, via machine learning-based optimization of the trainable model of the iterative process, a subset of iterations of the iterative process to perform. The subset of iterations is determined such that an accuracy and a number of active iterations of the iterative process are jointly optimized. Further, the program code includes code to process only the optimized subset of the iterations to perform the iterative process.

In another aspect of the present disclosure, a non-transitory computer readable medium is provided. The computer readable medium has encoded thereon program code for optimizing an iterative process. The program code is executed by a processor and includes code to determine, via a machine learning-based optimization, a subset of iterations of the iterative process to perform. The subset of iterations is determined such that an accuracy and a number of active iterations of the iterative process are jointly optimized. The program code also includes code to process only the subset of the iterations to perform the iterative process.

In another aspect of the present disclosure, a non-transitory computer readable medium is provided. The computer readable medium has encoded thereon program code for optimizing a LBP algorithm for LDPC decoding is provided.

The program code is executed by a processor and includes code to define a set of trainable parameters and a differentiable gating function to be applied to each parameter in the set of trainable parameters. The program code also includes code to build a trainable model of the LBP algorithm, in which the value of the differentiable gating function applied to the parameters is used to compute a weighted sum of check node messages corresponding to a current LDPC decoder iteration and a previous LDPC decoder iteration. In addition, the program code includes code to determine, via machine learning-based optimization of the trainable model of the LBP algorithm, a subset of layers to process in each LDPC decoder iteration. The subset of layers is determined such that a decoding accuracy and a number of active layers are jointly optimized. Further, the program code includes code to process only the subset of layers in each LDPC decoder iteration.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
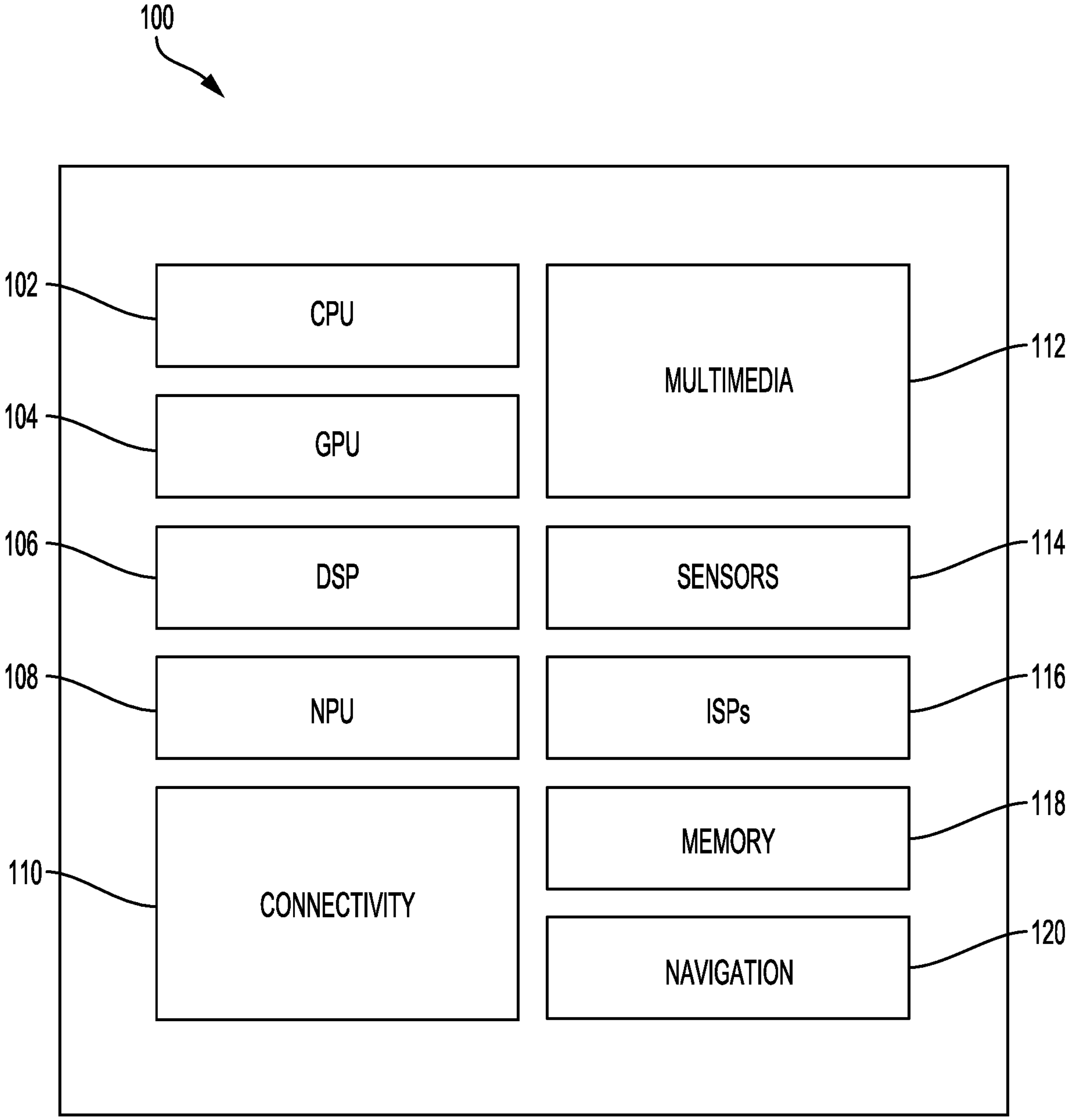
FIG. 1 illustrates an example implementation of designing a neural network using a system-on-a-chip (SOC), including a general-purpose processor, in accordance with certain aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including any 802.11 Wi-Fi standard since 802.11n (e.g., 802.11n, 802.11ac) and the like.

Iterative processes are frequently used in computing and communications, in which a specific calculation is performed for repeated cycles, or iterations, of operation until a condition is met to trigger a given process; these iterations may often be nested inside other iterations. It is often the case that a subset of iterations can be effectively skipped with minimal effect on the overall desired performance or accuracy of the iterative process. Thus, considerable compute time may be spent on the processing involved in iterations which have minimal impact on performance, resulting in a delay in completing the process, an increased cost in terms of area (e.g., memory or processor footprint) or power consumption, or an undesirable user experience. It is therefore desirable to identify which iterations may be effectively skipped with the least impact on performance or accuracy, so that the processing involved in these iterations can be skipped, and thus save compute time and resources with minimal impact on the performance or accuracy of the process.

Accordingly, aspects of the present disclosure are directed to a machine learning framework for improving, and in some cases optimizing, performance of an iterative process by simultaneously or jointly optimizing accuracy and active iterations, where an iteration is active if its processing is not being skipped. Other aspects of the present disclosure are directed to applying this machine learning framework to jointly optimize performance and active iterations of the layered belief propagation algorithm for low density parity check (LDPC) decoding.

FIG. 1 illustrates an example implementation of a system-on-a-chip (SOC) 100, which may include a central processing unit (CPU) 102 or a multi-core CPU configured for generating gradients for neural network training, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to determine, via the artificial neural network, a subset of iterations of the iterative process to perform. An accuracy and a number of active iterations of the iterative process are jointly optimized. The instructions loaded into the general-purpose processor 102 may comprise code to process only the subset of the iterations to perform the iterative process.

In another aspect of the present disclosure, the instructions loaded into the general-purpose processor 102 may comprise code to define a set of trainable parameters and defining a differentiable gating function to be applied to each parameter in the set of trainable parameters. The instructions loaded into the general-purpose processor 102 may also comprise code to build a trainable model of the iterative process, in which the iterative process is modified by using the value of the differentiable gating function applied to the parameters to compute a weighted sum of internal variables of the iterative process before and after each iteration. In addition, the instructions loaded into the general-purpose processor 102 may comprise code to determine, via machine learning-based optimization of the trainable model of the iterative process, a subset of iterations of the iterative process to perform. The subset of iterations is determined such that an accuracy and a number of active iterations of the iterative process are jointly optimized. Further, the instructions loaded into the general-purpose processor 102 may comprise code to process only the subset of the iterations to perform the iterative process.

In yet another aspect of the present disclosure, the instructions loaded into the general-purpose processor 102 may comprise code to define a set of trainable parameters and defining a differentiable gating function to be applied to each parameter in the set of trainable parameters. The instructions loaded into the general-purpose processor 102 may also comprise code to build a trainable model of the LBP algorithm, in which the value of the differentiable gating function applied to the parameters is used to compute a weighted sum of check node messages corresponding to a current LDPC decoder iteration and a previous LDPC decoder iteration. In addition, the instructions loaded into the general-purpose processor 102 may comprise code to determine, via machine learning-based optimization of the trainable model of the LBP algorithm, a subset of layers to process in each LDPC decoder iteration. The subset of layers is determined such that a decoding accuracy and a number of active layers are jointly optimized. Furthermore, the instructions loaded into the general-purpose processor 102 may comprise code to process only the subset of layers in each LDPC decoder iteration.

A learning algorithm may be implemented on device (e.g., via SOC 100) or may be implemented off-line. The learning algorithm may be used for example, to optimize performance of iterative processes. The learning algorithm adjusts trainable parameters by defining a loss or error function associated with the trainable parameter and using minimization techniques such as gradient descent to determine an optimized value of the trainable parameters.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
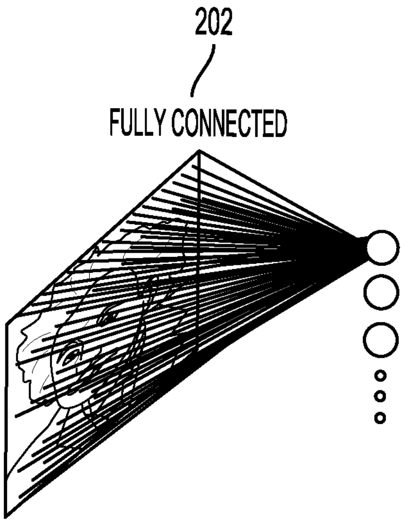
FIGS. 2A and 2B are diagrams illustrating a neural network, in accordance with aspects of the present disclosure.
Figure 2B:
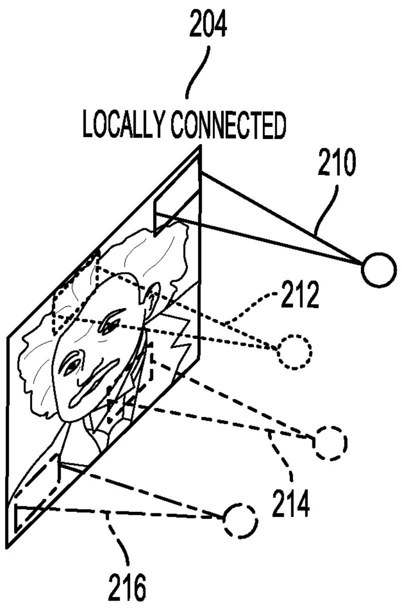

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

To adjust the weights, a learning algorithm or process may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of example. This approximation method may be referred to as stochastic gradient descent. Stochastic gradient descent may be repeated until the achievable error rate of the entire system has stopped decreasing or until the error rate has reached a target level. After learning, a neural network (NN) may be presented with new inputs and a forward pass through the network may yield an output 422 that may be considered an inference or a prediction of the NN.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

In some aspects, the SOC 100 or other devices or components disclosed herein may include means for receiving, means for determining and/or means for processing. In some aspects, the SOC 100 or other devices or components may include means for defining, means for building, means for determining and/or means for processing. In some aspects, SOC 100 or other devices disclosed herein may include means for jointly minimizing, means for optimizing, means for setting, means for defining, means for computing, means for receiving, and/or means for skipping. Such means may include one or more components of the SOC 100 described in connection with FIG. 1.

As described, iterative processes are frequently used in computing and communications, in which a specific calculation is performed for repeated cycles, or iterations, of operation until a condition is met to trigger a given process; these iterations may often be nested inside other iterations. It is often the case that a subset of iterations can be effectively skipped with minimal effect on the overall desired performance or accuracy of the iterative process. Thus, considerable compute time may be spent on the processing involved in iterations, which have minimal impact on performance, resulting in a delay in completing the process, an increased cost in terms of area or power, or an undesirable user experience.

To address these and other challenges, aspects of the present disclosure are directed to a machine learning framework for improving, and in some cases optimizing, performance of an iterative process by simultaneously or jointly optimizing accuracy and active iterations, where an iteration is active if its processing is not being skipped. Other aspects of the present disclosure are directed at applying this machine learning framework to jointly optimize performance and active iterations of the layered belief propagation algorithm for LDPC decoding.

Consider an iterative process with inputs X={x} and outputs Y={y}, where sample sets of {x, y} can readily be generated for the purpose of training (e.g., supervised learning). The iterative process may be formulated to get from X to Y by mapping its inputs X into a set of internal variables with values initialized by M[0], and, in each iteration, t, updating its internal variables from the values M[t−1] to M[t]; after T iterations, the internal variables may be given by M[T], which may be mapped to desired outputs Y. Example pseudocode for an iterative process is shown in Process 1 below, where $f_i(\ )$ maps the process inputs to the initial values of the internal variables, M[0], $f_o(\ )$ maps the final internal variable values to the output Y, and $\{f_t(\ )\}$, for 1 t≤T, is a set of T functions, where each function $f_t(\ )$ updates the values of the internal variables in iteration t.

Process 1 General Iterative Process

```
1: procedure [Y] = ALGORITHM (X, T)
2:    M[0] ← f_i(X)            ▹Initialize internal variables to some
                                function of inputs
3:    for 1 ≤ t ≤ T do
4:       M[t] ← f_t(M[t − 1])   ▹Update internal variables
5:    end for
6:    Y ← f_o(M[T])             ▹Map final values of internal
                                variables to output
7: end procedure
```

Given that the performance of the iterative process of Process 1 may be inversely correlated to a (loss) function of all its variables $\mathcal{L}_{acc}$(X,M,Y), where minimizing $\mathcal{L}_{acc}$(X, M,Y) maximizes the iterative process performance, the iterative process may be optimized to determine an importance level of iterations for the process performance, or, alternatively, which iterations may be skipped with the least impact on performance.

In accordance with aspects of the present disclosure, a gating function g(θ) is provided. The gating function g(θ)

may be applied to a set of trainable parameters Θ, where Θ is a T×1 vector, and T is the number of iterations. For a binary-valued gating function g(θ), if g(Θ[t])=0, iteration t may be skipped. On the other hand, if g(Θ[t])=1, operations for iteration t may proceed as specified, for example, in line 4 of Process 1. That is, internal variables (M) may be updated by directly passing $f_t$(M[t−1]) to M[t]. This functionality may be functionally implemented, by way of example, as shown in Process 2.

Notably, in Process 2, instead of directly passing $f_t$ (M[t−1]) to M[t], a weighted average of $f_t$(M[t−1]) and M[t−1] is passed with weights given by g(Θ[t]) and 1−g(Θ[t]), respectively. If g(Θ[t])=0, iteration tis effectively skipped, as M[t] is equal to M[t−1], while if g(Θ[t])=1, M[t] is updated to $f_t$(M[t−1]), as in Process 1, giving the functionally equivalent Process 3 for binary-valued g(θ)(e.g., g(θ)∈{0,1}).

Process 2 Trainable Process

```
procedure [Y] = TRAINABLE PROCESS (Θ, X, T)
  M[0] ← f_i(X)    ▹ Initialize internal variables to some function of inputs
  for 1 ≤ t ≤ T do
    M[t] ← g(Θ[t]) × (f_t(M[t − 1]) − M[t − 1]) + M[t − 1]
  end for
  Y ← f_o(M[T])    ▹ Map final values of internal variables to output
end procedure
```

Process 3 Process With Binary-Valued g(Θ[t, l]) ∈ 0, 1

```
procedure [Y] = BINARY ALGORITHM (Θ, X, T)
  M[0] ← f_i(X)              ▹ Initialize internal variables to some function of inputs
  for 1 ≤ t ≤ T do
    if g(Θ[t]) = 1 then
      M[t] ← f_t(M[t − 1])    ▹ the iteration is active
    else if g(Θ[t]) = 0 then
      M[t] ← (M[t − 1])        ▹ skip the iteration
    end if
  end for
  Y ← f_o(M[T])              ▹ Map final values of internal variables to output
end procedure
```

As any function of a binary-valued g(θ) has derivatives that are either 0 or undefined, to optimize Θ[t] using derivative-based methods such as gradient descent, in some aspects, g(θ) may be set to a real-valued, continuous, and differentiable function. In one example, the gating function may be a sigmoid function during training and may be expressed as:

$$\text{During training: } g(\theta) = f_\sigma(\theta) = \frac{1}{1+e^{-\theta}}, \tag{1}$$

where $f_\sigma(\theta)$ is the sigmoid function. Because g(θ) is not binary-valued for training, Process 2 may be used for training.

After training, in some aspects, for any t where Θ[t]≤−3, meaning $f_\sigma$(Θ[t])≈0, the corresponding iteration may be skipped. Thus, for inference, for example, when running the optimized process in accordance with aspects of the present disclosure, the gating function g(θ) may be given by:

$$\text{During inference: } g(\theta) = u(\theta+3) = \begin{cases} 1, & \text{if } \theta \geq -3 \\ 0, & \text{otherwise} \end{cases}, \tag{2}$$

where u(θ) is the unit step function.

Figure 3:
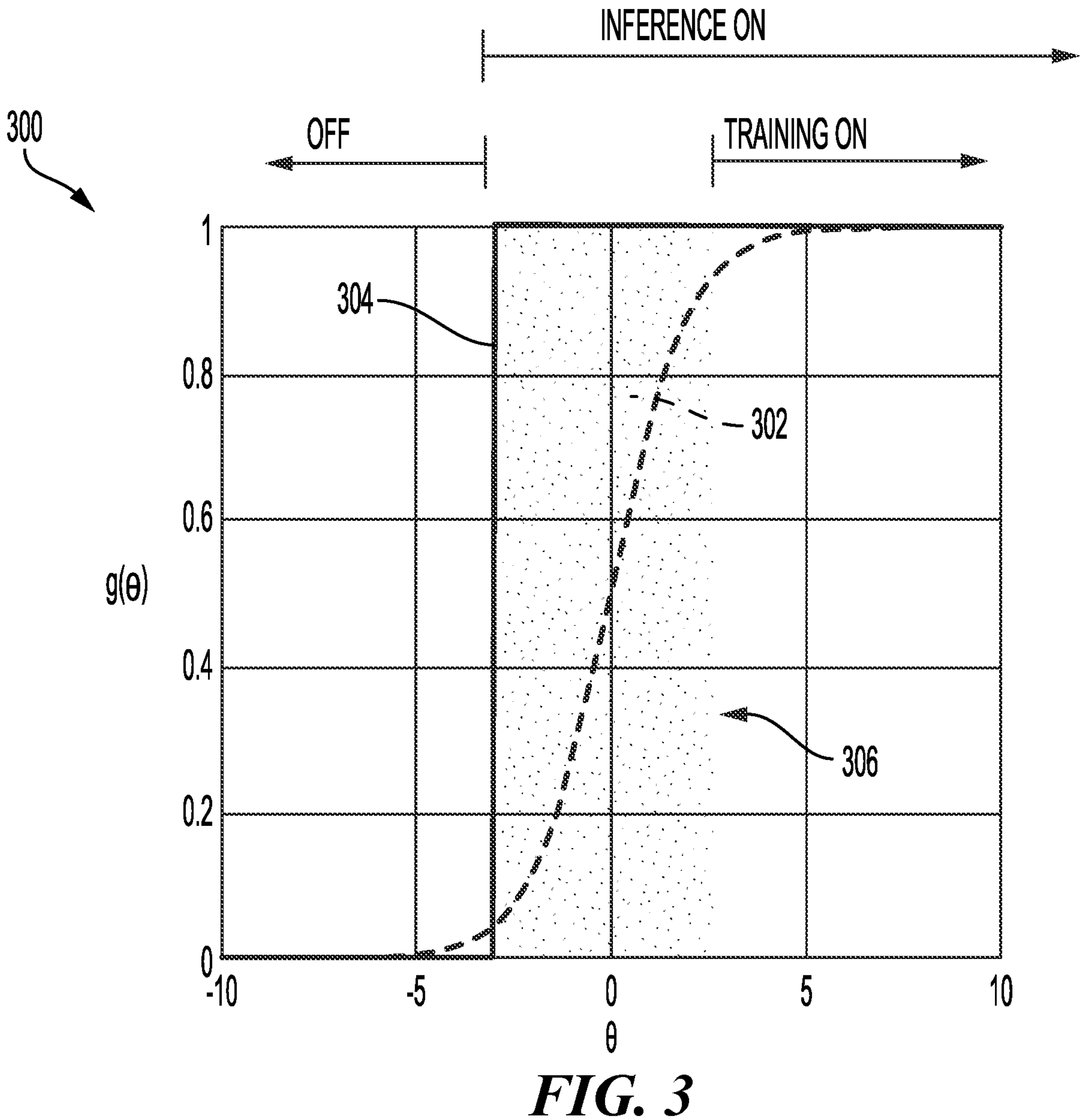
FIG. 3 is a graph illustrating example gating functions for training and inference, in accordance with aspects of the present disclosure.

FIG. 3 is a graph 300 illustrating gating functions for training and inference, in accordance with aspects of the present disclosure. Referring to a curve 302 shown in FIG. 3, and as specified in Equation 1, during training, the gating function g(θ) may be a real-valued, continuous, and differentiable function shown, for example, by way of the curve 302. During training, the gating function is very nearly 0, and therefore effectively OFF, if θ<−3, and is very nearly 1, and therefore effectively ON, if θ>3. However, the gating function $f_\sigma(\theta)$ is always continuous and differentiable for all values of θ. Accordingly, an artificial neural network model implementing Process 2 may be trained, with Θ[t] optimized using gradient-based methods, such that the gating function g(Θ[t]) may be optimized to be effectively OFF when doing so corresponds to the least reduction in accuracy associated with the iterative process.

On the other hand, during inference, the gating function g(θ) may be a step function as shown by way of a waveform 304. As shown in the waveform 304 in FIG. 3, during inference, if θ≥−3, the gating function g(θ) is 1 and ON, and 0 and OFF otherwise.

For inference, g(θ) is binary-valued, so iterations where g(Θ[t])=0 are skipped, and iterations where g(Θ[t])=1 are active, as shown, for example, in Process 3.

As one goal is to find the set of Θ[t] to minimize the total number of active iterations for a given performance target, a loss function may be determined to simultaneously minimize both the number of active iterations and the algorithm accuracy loss function $\mathcal{L}_{acc}$. As indicated in Equation 2 and Process 3, if an iteration is active when its corresponding Θ[t]≥−3, then the number of active iterations, $L_{active}$ is given by:

$$L_{active} = \sum_{t=1}^{T} u(\Theta[t]+3), \tag{3}$$

where u(θ) is the unit-step function.

Because the derivative of Equation 3 is either zero or undefined, to optimize the number of active iterations using derivative-based methods such as gradient descent, a real-valued, continuous, and differentiable sigmoid function may be substituted for the unit-step function in Equation 3 to produce a loss function component, $\mathcal{L}_{active}$, for optimizing the number of active iterations, such as:

$$\mathcal{L}_{active} = \sum_{t=1}^{T} f_\sigma(\Theta[t]+3), \tag{4}$$

where $\theta_\sigma(x)$ is the sigmoid function given in Equation 1.

Θ in the range (−3, 3), shown as a rectangular area 306 beneath waveform 304 in FIG. 3, are typically sub-optimal and may be avoided, since, for such Θ, the corresponding iteration is still active during inference, despite the optimizer indicating that the corresponding iteration can be at least somewhat attenuated with minimal accuracy loss. Such Θ may be conceptualized as an optimizer indicating some remaining ambiguity about whether the iteration may be skipped. In some aspects, it may be preferable for the optimizer to unambiguously indicate either that the iteration should definitely be skipped (e.g., $\Theta<-3$) or definitely active (e.g., $\Theta>3$). In Equation 4, as shown by a curve 602*b* in FIG. 6, the shift by three effectively penalizes all iterations with $\Theta[t]\geq-3$, as these iterations are not skipped during inference. In practice, this shift relative to the training gating function in Equation 1 results in an optimized $\Theta[t]$, which may seldom be in the range (−3, 3), as $\Theta[t]$ in (−3, 3) hurts accuracy by attenuating the corresponding $f_t(M[t-1])$ component in Equation 2, so they result in high losses in both $\mathcal{L}_{acc}$ and $\mathcal{L}_{active}$. By using such a shifted cost function, ambiguity about whether an iteration should be active or skipped may thus be substantially reduced, and in some aspects, eliminated entirely.

In some aspects, the accuracy and the number of active iterations may be simultaneously optimized. This may be achieved by computing a weighted sum of the loss functions of $\mathcal{L}_{acc}$ and $\mathcal{L}_{active}$ to produce the total loss function to optimize, which is thus given by:

$$\mathcal{L}=\lambda_{acc}\times\mathcal{L}_{acc}+\lambda_{active}\times\mathcal{L}_{active}, \tag{5}$$

where $\lambda_{acc}$ is a scaling factor set to normalize $\mathcal{L}_{acc}$ relative to $\mathcal{L}_{active}$ when $\lambda_{active}=1$ and all iterations are active, and $\lambda_{active}$ is a hyperparameter allowing for different tradeoffs between the number of active iterations (e.g., compute time and resources) and accuracy.

The $\lambda_{acc}$ scaling factor makes the two components of Equation 5 comparable when all iterations are active and $\lambda_{active}=1$, implying that the second term in Equation 5 is given by T. For a given iterative process, $\lambda_{acc}$ can be derived by feeding the iterative process, having all iterations active, with training data, and then calculating the resulting $\mathcal{L}_{acc}$, referred to as $$\mathcal{L}_{acc}^{0};\lambda_{acc},$$

is then given by:

$$\lambda_{acc}=\frac{T}{\mathcal{L}_{acc}^{0}}, \tag{6}$$

so that when all iterations are active, $\lambda_{active}=1$, and $$\mathcal{L}_{acc}=\mathcal{L}_{acc}^{0},$$

the two components of Equation 5 are equal.

For a given generic process to be optimized, the procedure is to first implement Process 2, with a differentiable $g(\theta)$ such as the one defined in Equation 1, as a model in a machine learning framework, such as, for example, TensorFlow. The machine learning framework may operate to find the optimal parameters $\Theta[t]$, which minimize the loss function provided in Equation 5. The resulting optimized $\Theta[t]$ may then be used with a binary-valued $g(\theta)$ such as the one defined in Equation 2 in Process 3 to indicate which iterations may be optimally skipped with minimal performance loss.

Although, the procedure in this example is applied to an iterative process with a single un-nested loop, this is for simplicity and ease of explanation and not limiting. Rather, the example optimization may be applied to iterative algorithms and processes with any number of nested loops by substituting the trainable parameter vector $\Theta[t]$, indexed by the single loop variable, t, with a multi-dimensional $\Theta[t_1, t_2, t_3, \ldots]$, where the $t_i$ are the loop variables corresponding to each level of the nested loops. Similarly, the sums in Equations 3 and 4 may be taken over all of the loop variables $t_i$. The optimization procedure described above can thus be applied to optimally include or exclude iterations at any arbitrary level of nesting.

In some aspects, the optimization process may be applied to the decoding of low density parity check (LDPC) codes, for instance. LDPC codes are a special class of linear block codes that may be used for forward error correction coding. LDPC codes may be applied, for example, to wireless communications to improve reliability and efficacy of wireless communications, especially in the presence of noise. As such, LDPC codes have found wide commercial application, especially in modern wireless communications standards such as 5G NR cellular, and Wi-Fi 802.11n and 802.11ac, for instance.

An LDPC code may be defined by its parity check matrix (PCM); an (N, K) LDPC code will convert K information bits into N codeword bits, and will have a PCM, which is $(N-K)\times N$, where the N columns correpond to the codeword bits, and the N−K rows correspond to the parity checks on those bits. PCMs are often constructed by concatenating and stacking permuted $Z\times Z$ identity matrices, and $Z\times Z$ all-zero matrices, where Z is referred to as the lifting factor. Such construction has many benefits, including enabling parallelization on the order of Z in hardware implementations of encoding and decoding. In 5G NR implementations, the first 2Z encoded bits may be punctured (e.g., removed from the codeword) before transmitting. The punctured bits may then be inferred from the other received bits during decoding.

Well-designed LDPC codes have been found to achieve good capacity for their block lengths, while simultaneously lending themselves to efficient decoding using the layered belief propagation (LBP) algorithm, for example. LBP is an iterative algorithm in which the rows of the parity check matrix (PCM) are sequentially processed. For LDPC codes constructed with a lifting factor Z, the Z rows corresponding to each permuted identity matrix may be referred to as a "layer," and may be processed in parallel. The term "row" may refer to such a collection of Z rows (e.g., a layer). Similarly, the term "column" may refer to a set of Z columns corresponding to a permuted identity matrix. The LBP algorithm typically runs for several iterations, and in each of these "outer" iterations, the LBP algorithm iterates over each of the layers in the PCM. The processing of the PCM layers is thus the innermost nested loop of the LBP algorithm, and the term "layer" may also refer to this processing.

Increasing the number of LBP iterations may improve performance up to some asymptote. Timeline and hardware constraints often result in LDPC decoder implementations terminating decoding at a number of iterations far lower than the number of iterations performed to achieve the asymptotic performance. In conventional LBP implementations, all of the layers are processed in each iteration of the algorithm. In the early decoder iterations, processing layers that correspond to parity checks that include punctured bits yields no (or minimal) new information to the decoder, so such processing may be skipped with minimal performance degradation. Processing certain layers in the later iterations only may allow the decoder to achieve better performance for a given total number of processed layers, thus achieving better performance for a given decoding timeline. Alternatively, the same performance can be achieved with a shorter decoding timeline, thus potentially yielding an area and/or cost savings.

Accordingly, further aspects of the present disclosure provide a machine learning framework for systematically optimizing the set of layers to be processed for each decoder iteration, which may be referred to as a "schedule." An improved, and in some cases an optimal, schedule may be determined, which skips processing several layers in the earlier iterations of the LBP, as well as several layers in the later iterations of the LBP, leading to improved performance for a given total number of active layers. Accordingly, aspects of the present disclosure may be applied to systematically optimize the schedule for any LDPC code and rate.

Figure 4:
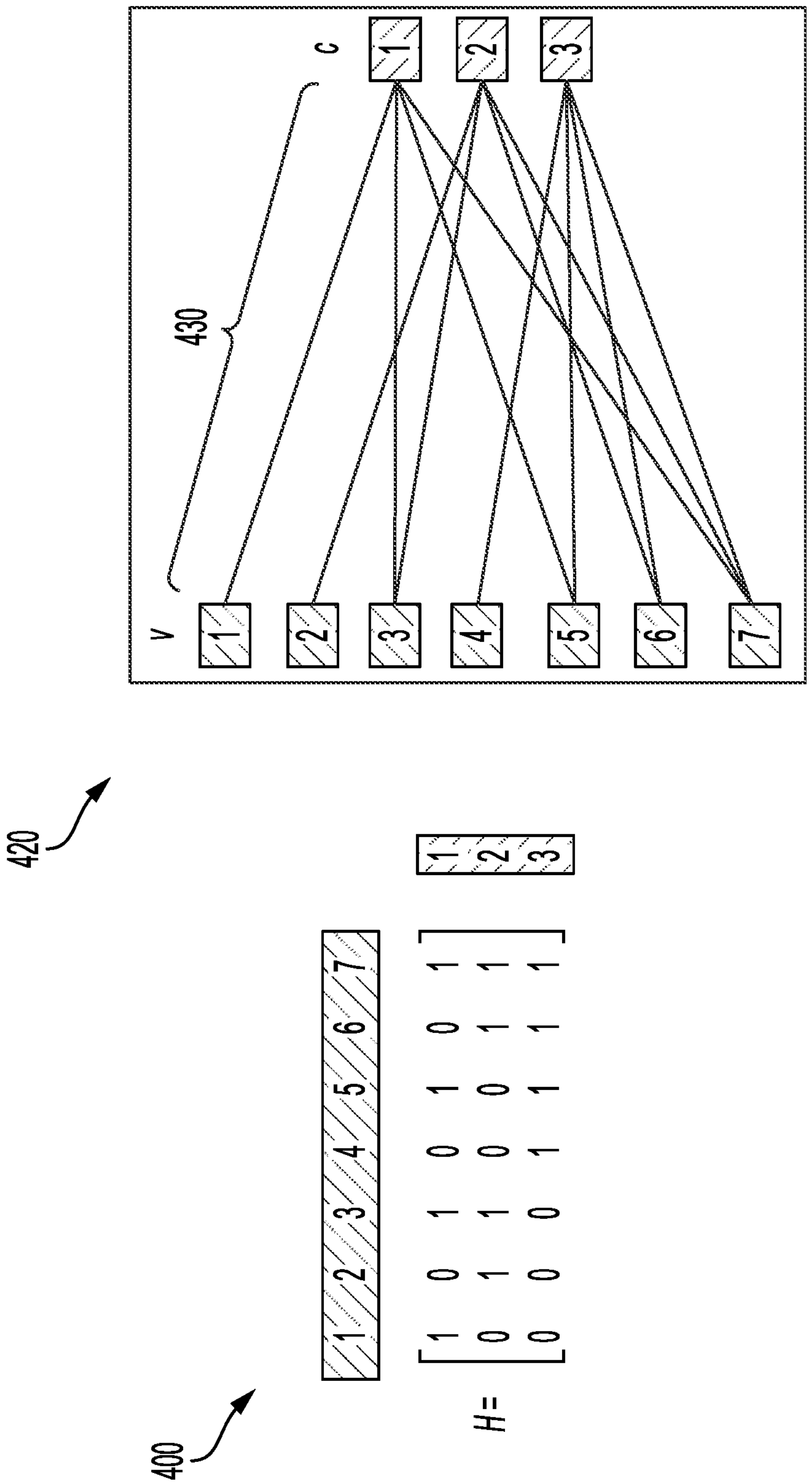
FIG. 4 is a diagram illustrating an example parity check matrix (PCM) and corresponding Tanner graph, in accordance with aspects of the present disclosure.

In some aspects, the parity check matrix (PCM) for any linear block code can be represented by a bipartite graph referred to as a Tanner graph. FIG. 4 is a diagram illustrating an example PCM 400 and corresponding Tanner graph 420, in accordance with aspects of the present disclosure. Referring to FIG. 4, the Tanner graph 420 includes two sets of vertices, V and C, which may be referred to as v-nodes and c-nodes, respectively. The Tanner graph 420 also includes a collection of edges E 430, where each edge $e \in E$ connects some c-node, $\bar{c} \in C$ to some v-node, $\bar{v} \in V$, which is denoted as $e=\{\bar{c},\bar{v}\}$. The v-nodes correspond to the columns of the PCM 400, which in turn correspond to the codeword bits, while the c-nodes correspond to the rows of the PCM 400, which in turn correspond to the parity checks. The Tanner graph 420 has an edge connecting a v-node to a c-node if and only if there is a 1 in the corresponding {row, column} of the PCM 400. For instance, some of the edges in 430 are connecting c-node 1 to v-nodes {1, 3, 5, 7}. One feature of LDPC codes is that, as opposed to the PCM 400, they have sparse (e.g., low density) PCMs. LDPC codes, therefore, also have low density (relatively few edges) in their Tanner graph representation, so $|E| <- |V| \times |C|$. For example, an LDPC code could be constructed from PCM 400 by replacing the ones (1's) in PCM 400 with permuted Z×Z identity matrices and replacing the zeros (0's) in PCM 400 with Z×Z all-zero matrices, for some large value of Z, where Z is then referred to as the lifting factor.

For a codeword of size N, each of the N v-nodes, or codeword bits, may be associated with a probability indicating whether that bit is a 0 or a 1. In decoder implementations, these probabilities may be represented by log-likelihood ratios (LLRs). Initially, these LLRs are set based on the conditional probabilities given the received signal r:

$$\alpha_0^v = \ln\left(\frac{Pr\{b^v = 0 \mid r\}}{Pr\{b^v = 1 \mid r\}}\right),\ 1 \le v \le N, \tag{7}$$

where $$\alpha_0^v$$

is the initial LLR associated with v-node v, and $b^v$ is the codeword bit associated with v-node v.

A belief propagation (BP) algorithm is a message passing process on the Tanner graph of the code, in which the LLRs $\alpha=\{\alpha^v\}$ associated with the v-nodes are updated, and ideally improved. In each iteration of a conventional BP process, all nodes in the graph are visited at least once. The operations performed when visiting c-nodes, in which incoming v→c messages are converted into outgoing c→v messages, are referred to as "scan" operations. The operations performed when visiting v-nodes, in which incoming c→v messages are converted into outgoing v→c messages, and a is updated, are referred to as "update" operations.

The order in which nodes are visited is referred to as the schedule. Conventionally, because the same order was used for all iterations, the schedule refers to the order of visiting nodes in a single iteration. In accordance with aspects of the present disclosure, the nodes to be visited may change in each iteration, thus the term "schedule" refers to the order in which nodes are visited across all iterations. In flooding schedules, in each iteration, all c-nodes are visited in parallel, after which all v-nodes are visited in parallel. In layered schedules, c-nodes are visited in sequence. In general, even in layered implementations, the Z c-nodes corresponding to a layer are processed in parallel, followed by all the v-nodes connected to those Z c-nodes (e.g., a flooding schedule is used on each collection of Z c-nodes corresponding to a layer). Although the present disclosure refers to singular c-nodes and v-nodes, this is merely by way of example and for simplicity and ease of understanding, and the present disclosure applies to cases with multiple c-nodes and v-nodes (e.g., Z>1) with appropriate parallelization. A single, specific c-node or v-node may be referred to as $\bar{c}$ or $\bar{v}$, respectively, while a set of multiple c-nodes or v-nodes will be referred to as $\vec{c}$ or $\vec{v}$, respectively.

Figure 5A:
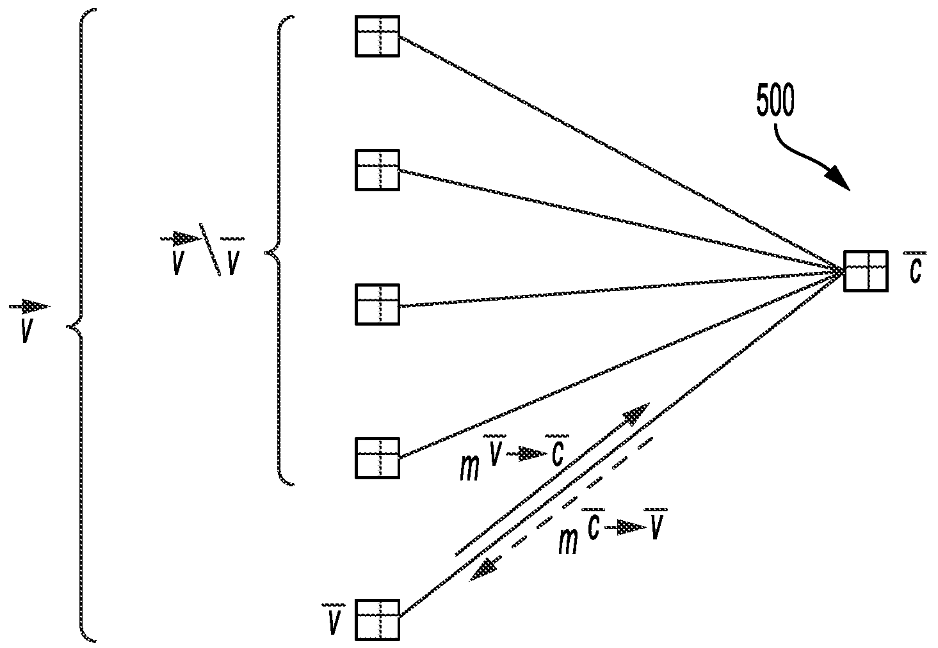
FIGS. 5A and 5B are diagrams illustrating example subgraphs of a low density parity check (LDPC) Tanner graph for a c-node and a v-node, respectively, in accordance with aspects of the present disclosure.
Figure 5B:
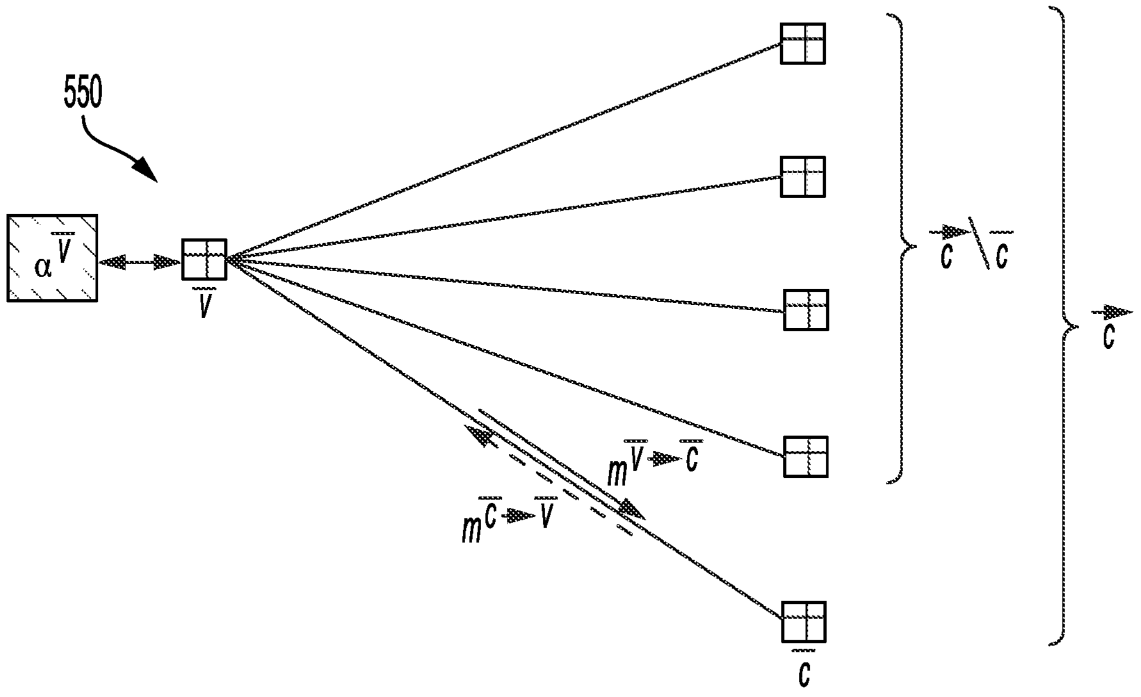

FIGS. 5A and 5B are diagrams illustrating example subgraphs of a Tanner graph for a c-node 500 and a v-node 550, respectively, in accordance with aspects of the present disclosure. Referring to FIG. 5A, in layered belief propagation (LBP), each time a c-node is visited, a scan operation is performed to generate outgoing c→v messages for each of the v-nodes connected to that c-node. Before visiting another c-node and performing another scan, update operations are performed at each of the v-nodes connected to the visited c-node. Thus, processing a layer in the LBP algorithm includes performing a scan at the visited c-node and performing updates at the v-nodes connected to that c-node. In a conventional LBP implementation, an iteration of the LBP process is complete when all layers have been processed. Note that in a single iteration of conventional LBP, each c-node is visited exactly once, while a v-node connected to multiple c-nodes is visited once for each c-node to which it is connected.

The processing of a single layer during LBP iteration t involves visiting a single c-node, $\bar{c}$, connected to a collection of d v-nodes, $\vec{v} \subset V$. In the scan operation, the c-node converts d incoming messages, one message from each v-node $\bar{v} \in \vec{v}$, into d outgoing messages, one to each v-node $\bar{v} \in \vec{v}$. The d incoming messages in iteration t may be referred to as $m^{\vec{v}\rightarrow\bar{c}}[t]$, while the d outgoing messages may be referred to as $m^{\bar{c}\rightarrow\vec{v}}[t]$. The outgoing message on an edge is independent of the incoming message along the same edge, which may be referred to as the "own" message; each outgoing message may be a function of the other d−1 incoming messages. In a sum-product (SP) process, the outgoing messages $m^{\bar{c}\rightarrow\vec{v}}[t]$ for each $\vec{v} \in \vec{v}$ may be computed as:

$$m^{\bar{c}\to\bar{v}}[t] = 2\times\tanh^{-1}\left(\prod_{v\in\{\vec{v}\setminus\bar{v}\}}\tanh\left(\frac{m^{v\to\bar{c}}[t]}{2}\right)\right),\ \text{for each } \bar{v}\in\vec{v}. \tag{8}$$

In some aspects, more computationally-efficient approximations may be substituted for Equation 8.

Each v-node $\bar{v}$ in the collection of v-nodes $\vec{v}$ connected to the c-node $\bar{c}$ in FIG. 5A is itself connected to a set of multiple c-nodes $\vec{c}\subset C$, including $\bar{c}$ (e.g., $\bar{c}\in\vec{c}$), as shown in FIG. 5B. In LBP, after applying Equation 8 for the c-node $\bar{c}$ corresponding to a given layer, all the LLRs $\alpha^{\vec{v}}=\{\alpha^{\bar{v}}\}$ for each of the v-nodes $\bar{v}\in\vec{v}$ are immediately updated. In general, the LLR $\alpha^{\vec{v}}$ for each v-node $\bar{v}$ may be updated by summing over all of the messages $m^{\bar{c}\to\bar{v}}[t]$, as follows:

$$\alpha^{\bar{v}} = \alpha_0^{\bar{v}} + \sum_{c\in\vec{c}} m^{c\to\bar{v}}[t],\ \text{for each } \bar{v}\in\vec{v}, \tag{9}$$

where the above sum is taken over all of the incoming messages to $\bar{v}$, corresponding to all c-nodes $\vec{c}$ connected to $\bar{v}$, including the c-node $\bar{c}$ corresponding to the current layer.

This update may be simplified significantly by noting that for any given layer, only the messages coming out of the corresponding c-node, $\bar{c}$, have changed, implying that for any given v-node $\bar{v}$, the only new value in Equation 9 is $m^{\bar{c}\to\bar{v}}[t]$. Thus, the $\alpha^{\bar{v}}$ associated with $\bar{v}$ may be updated to reflect the new value of $m^{\bar{c}\to\bar{v}}[t]$. Because, prior to this layer, ar is given by Equation 9, but computed with $m^{\bar{c}\to\bar{v}}[t-1]$ from the previous iteration, Equation 9 can be efficiently implemented by simply updating $\alpha^{\bar{v}}$, as follows:

$$\alpha^{\bar{v}} = \alpha^{\bar{v}} + m^{\bar{c}\to\bar{v}}[t] - m^{\bar{c}\to\bar{v}}[t-1],\ \text{for each } \bar{v}\in\vec{v}, \tag{10}$$

where $m^{\bar{c}\to\bar{v}}[0]=0$ for all edges $e=\{\bar{c},\bar{v}\}$ in the Tanner graph.

Equation 8 assumes access to the current iteration's v→c messages, $m^{v\to c}[t]$, which, for any given Tanner graph edge, $e\in E$, where $e=\{\bar{c},\bar{v}\}$, can readily be computed from the associated LLR, $\alpha^{\bar{v}}$, by removing the own message $m^{\bar{c}\to\bar{v}}$ Because this computation is done prior to the application of Equations 8 and 10 for the current iteration, the own message to be subtracted is $m^{\bar{c}\to\bar{v}}[t-1]$. Thus, for a given layer corresponding to c-node C, the incoming messages $m^{\bar{v}\to\bar{c}}[t]$ in Equation 8 are computed as:

$$m^{\bar{v}\to\bar{c}}[t] = \alpha^{\bar{v}} - m^{\bar{c}\to\bar{v}}[t-1],\ \text{for each } \bar{v}\in\vec{v}. \tag{11}$$

The full LBP algorithm is detailed in Process 4 for a total number of iterations, T; the algorithm receives the input LLRs $$\alpha_0^v,$$

and the Tanner graph G, indicated as collections of v-nodes, c-nodes, and edges, V, C, and E, respectively. The algorithm returns an updated LLR vector $\alpha^v$, containing an updated LLR for each v-node $v\in V$; the decoded bits can be readily derived from the signs of these updated LLRs. The processing on lines 13, 14, and 15 of Process 4 may be parallelized, such that these are not nested loops; the inner-most loop is thus the loop over the layers.

According to aspects of the present disclosure, this algorithm can be modified to effectively skip processing layers in each iteration. In other aspects, a corresponding machine learning framework systematically optimizes the set of layers to be processed for each decoder iteration.

Process 4 Layered Belief Propagation (LBP) Process

1: procedure$[\alpha^v]$ = LBP(T, $\alpha_0^v$, G = [V, C, E])

2: for all $v\in V$ do

3: $\alpha^v \leftarrow \alpha_0^v$ ▷Initialize to received LLRs

4: end for

5: for all $e\in E$, $e=\{c, v\}$ do

6: $m^{c\to v}[0] \leftarrow 0$

7: end for

8: for $1\le t\le T$ do ▷Outer loop: LBP iterations

9: for $1\le l\le |C|$ do ▷Inner nested loop: Loop over layers

10: $\bar{c} \leftarrow l^{th}$ c-node in C

11: $\vec{v} \leftarrow$ set of v-nodes connected to $\bar{c}$

12: $m^{\bar{v}\to\bar{c}}[t] \leftarrow \alpha^{\bar{v}} - m^{\bar{c}\to\bar{v}}[t-1]$, for $\bar{v}\in\vec{v}$ 13: $m^{\bar{c}\to\bar{v}}[t] \leftarrow 2\times\tanh^{-1}\left(\prod_{v\in\{\vec{v}\setminus\bar{v}\}}\tanh\left(\frac{m^{v\to\bar{c}}[t]}{2}\right)\right)$, for $\bar{v}\in\vec{v}$ 14: $\Delta m^{\bar{c}\to\bar{v}} \leftarrow m^{\bar{c}\to\bar{v}}[t] - m^{\bar{c}\to\bar{v}}[t-1]$, for $\bar{v}\in\vec{v}$ 15: $\alpha^{\bar{v}} \leftarrow \alpha^{\bar{v}} + \Delta m^{\bar{c}\to\bar{v}}$, for $\bar{v}\in\vec{v}$ 16: end for 17: end for 18: end procedure In accordance with aspects of the present disclosure, and as described above, a gating function $g(\theta)$ is provided and applied to a set of trainable parameters $\Theta$, where $\Theta$ is a $T\in|C|$ matrix, T is the number of iterations, C is the set of c-nodes, and $|C|$ refers to the number of elements in C, which is the number of layers (for Z>1

$$\frac{|C|}{Z}$$

should be substituted for $|C|$). For binary-valued $g(\theta)$, when $g(\Theta[t,l])=1$, layer l of iteration t is processed as in Process 4, while when $g(\Theta[t,l])=0$, layer l of iteration t is effectively skipped. This functionality can be functionally implemented, for example, as shown in Process 5. The processing on lines 13, 14, 15, and 16 of Process 5 is may be parallelized, such that these are not nested loops; the inner-most loop is thus the loop over the layers.

Process 5 Trainable Partial-Iteration (PI) Layered Belief Propagation (LBP) Process

1: procedure[$\alpha^v$] = TRAINABLE PI LBP(T, $\alpha_0^v$, G = [V, C, E])
2: for all v ∈ V do
3: $\alpha^v \leftarrow \alpha_0^v$ ▹Initialize to received LLRs
4: end for
5: for all e ∈ E, e = {c, v} do
6: $m^{c\rightarrow v}[0] \leftarrow 0$
7: end for
8: for 1 ≤ t ≤ T do ▹Outer loop: LBP iterations
9: for 1 ≤ l ≤ |C| do ▹Inner nested loop: Loop over layers
10: $\bar{c} \leftarrow l^{th}$ c-node in C
11: $\vec{v} \leftarrow$ set of v-nodes connected in $\bar{c}$
12: $m^{\bar{v}\rightarrow\bar{c}}[t] \leftarrow \alpha^{\bar{v}} - m^{\bar{c}\rightarrow\bar{v}}[t-1]$, for $\bar{v} \in \vec{v}$
13: $m^{\bar{c}\rightarrow\bar{v}}[t] \leftarrow 2\times\tanh^{-1}\left(\prod_{v\in\{\vec{v}\setminus\bar{v}\}}\tanh\left(\frac{m^{v\rightarrow\bar{c}}[t]}{2}\right)\right)$, for $\bar{v}\in\vec{v}$
14: $m^{\bar{c}\rightarrow\bar{v}}[t] \leftarrow g(\Theta[t,l]) \times (m^{\bar{c}\rightarrow\bar{v}}[t] - m^{\bar{c}\rightarrow\bar{v}}[t-1]) + m^{\bar{c}\rightarrow\bar{v}}[t-1]$,, for $\bar{v} \in \vec{v}$
15: $\Delta m^{\bar{c}\rightarrow\bar{v}} \leftarrow m^{\bar{c}\rightarrow\bar{v}}[t] - m^{\bar{c}\rightarrow\bar{v}}[t-1]$, for $\bar{v} \in \vec{v}$
16: $\alpha^{\bar{v}} \leftarrow \alpha^{\bar{v}} + \Delta m^{\bar{c}\rightarrow\bar{v}}$, for $\bar{v} \in \vec{v}$
17: end for
18: end for
19: end procedure Notably, as indicated in Process 5, if g(Θ[t,l])=1, line 14 is a simple pass-through, such that layer processing is unchanged in comparison to Process 4. However, if g(Θ[t, l])=0, line 14 forces $m^{\bar{c}\rightarrow\bar{v}}[t]$ to $m^{\bar{c}\rightarrow\bar{v}}[t-1]$, and $\Delta m^{\bar{c}\rightarrow v}$ to 0, giving the functionally equivalent Process 6 for binary-valued g(θ). Also, note that Processes 5 and 6, respectively, substantially apply nested versions of the more generic Processes 2 and 3, respectively, to the specific layered belief propagation algorithm of Process 4, where the innermost nested iterations to be optimized are referred to as "layers" in the context of the layered belief propagation algorithm.

As any function of a binary-valued g(θ) has derivatives that are always either 0 or undefined, to optimize Θ[t,l] using derivative-based methods such as gradient descent, g(θ) may be set to a real-valued, continuous, and differentiable sigmoid function during training. For instance, during training, the following function may be used for g(θ):

$$\text{During training: } g(\theta) = f_\sigma(\theta) = \frac{1}{1+e^{-\theta}}, \tag{12}$$

where $f_\sigma(x)$ is the sigmoid function, as defined in Equation 12. Since g(Θ[t,l]) is not binary-valued for training, Process 5 is used for training.

Process 6 Partial-Iteration (PI) Layered Belief Propagation (LBP) Algorithm for Binary-Valued g(Θ [t, l])

procedure[$\alpha^v$] = Binary PI LBP(T, $\alpha_0^v$, G = [V, C, E])
for all v ∈ V do
$\alpha^v \leftarrow \alpha_0^v$ ▹Initialize to received LLRs
end for
for all e ∈ E, e = {c, v} do
$m^{c\rightarrow v}[0] \leftarrow 0$
end for
for 1 ≤ t ≤ T do
for 1 ≤ l ≤ |C| do ▹Loop over layers
if g(Θ [t, l]) = 1 then
$\bar{c} \leftarrow l^{th}$ c-node in C
$\vec{v} \leftarrow$ set of v-nodes connected in $\bar{c}$
$m^{\bar{v}\rightarrow\bar{c}}[t] \leftarrow \alpha^{\bar{v}} - m^{\bar{c}\rightarrow\bar{v}}[t-1]$, for $\bar{v} \in \vec{v}$
$m^{\bar{c}\rightarrow\bar{v}}[t] \leftarrow 2\times\tanh^{-1}\left(\prod_{v\in\{\vec{v}\setminus\bar{v}\}}\tanh\left(\frac{m^{v\rightarrow\bar{c}}[t]}{2}\right)\right)$, for $\bar{v}\in\vec{v}$
for all $\bar{v} \in \vec{v}$ do
$\Delta m^{\bar{c}\rightarrow\bar{v}} \leftarrow m^{\bar{c}\rightarrow\bar{v}}[t] - m^{\bar{c}\rightarrow\bar{v}}[t-1]$
$\alpha^{\bar{v}} \leftarrow \alpha^{\bar{v}} + \Delta m^{\bar{c}\rightarrow\bar{v}}$ -continued Process 6 Partial-Iteration (PI) Layered Belief Propagation (LBP) Algorithm for Binary-Valued g(⊖ [t, l])

```
            end for
        else if g(⊖ [t, l]) = 0 then
            c̄ ← l^th c-node in C
            v⃗ ← set of v-nodes connected in c̄
            for all v̄ ∈ v⃗ do
                m^{c̄→v̄}[t] ← m^{c̄→v̄}[t − 1]
            end for
        end if
    end for
  end for
end procedure
```

After training, in some aspects, for any t and l where $\Theta[t,l] \leq -3$, meaning $f_{\Theta}(\Theta[t,l]) \approx 0$, the corresponding layer may be skipped. Thus, for inference:

$$\text{During inference: } g(\theta) = u(\theta + 3) = \begin{cases} 1, & \text{if } \theta \geq -3 \\ 0, & \text{otherwise} \end{cases}, \tag{13}$$

where u(x) is the unit step function.

For inference (as opposed to training), $g(\theta)$ is binary-valued, so layers where $g(\Theta[t,l])=0$ are skipped, and layers where $g(\Theta[t,l])=1$ are active, as shown, for example, in Process 6. The gating functions for training and inference may be given by Equations 12 and 13, respectively In some aspects, $\Theta[t,l]$ may be optimized using conventional machine learning frameworks, such as TensorFlow. In some aspects, $\Theta[t,l]$ may be optimized via TensorFlow using three-dimensional tensors for the Tanner graph messages (m and $m^{\bar{c}\to\bar{v}}$) in each layer, with dimensions given by d, Z, and M, where d is the degree of each of the Z c-nodes in the layer, Z is the lifting factor, and M is the number of training examples in each mini-batch. The LLRs $\alpha^{v}$ may be represented by a three-dimensional tensor with dimensions given by $$\frac{N}{Z},$$

Z, and M, where N is the codeblock size. Leveraging these three-dimensional tensors may allow for an efficient and fully-parallel implementation of each layer's processing.

Because one goal is to find the set of $\Theta[t,l]$ to minimize the total number of active layers for a given performance (decoding accuracy) target, a loss function that allows for trading off accuracy and active layers is employed. The binary cross-entropy loss, averaged over the decoder output LLRs, may be used for the accuracy component of the loss function, $\mathcal{L}_{acc}$, in which case:

$$\mathcal{L}_{acc} = -\frac{1}{N}\sum_{v=1}^{N} b^{v} \times \log(f_{\sigma}(-\alpha^{v})) + (1-b^{v}) \times \log(1-f_{\sigma}(-\alpha^{v})), \tag{14}$$

where the $b^{v}$ are the encoded bit values (corresponding to the correct decoded bit values) for each training example.

A polarity reversal is used, (e.g., $-\alpha^{v}$ as opposed to $\alpha^{v}$) inside the sigmoid function due to the definition of LLRs as being positive when the likelihood of '0' is greater than the likelihood of '1,' while the sigmoid function maps positive values to be closer to '1' and negative values to be closer to '0.'

Minimizing only the loss function of Equation 14 optimizes the decoder accuracy but does not minimize the number of active layers. Referring to Eq. 13 and Process 6, note that if a layer is active in a particular iteration when its corresponding $\Theta[t,l] \leq -3$, then the number of active layers, $L_{active}$ is given by:

$$\mathcal{L}_{active} = \sum_{t=1}^{T}\sum_{l=1}^{|C|} u(\Theta[t,l]+3), \tag{15}$$

where u(x) is the unit-step function. Because the derivative of Equation 15 is either zero or undefined, the number of active layers may be optimized using derivative-based methods such as gradient descent by substituting a differentiable function, such as, for example, the sigmoid function in Equation 12, for the unit step function in Equation 15 to produce a loss function component, $\mathcal{L}_{active}$, for optimizing the number of active layers:

$$\mathcal{L}_{active} = \sum_{t=1}^{T}\sum_{l=1}^{|C|} f_{\sigma}(\Theta[t,l]+3), \tag{16}$$

where $f_{\sigma}(x)$ is the sigmoid function given in Equation 12.

Figure 6:
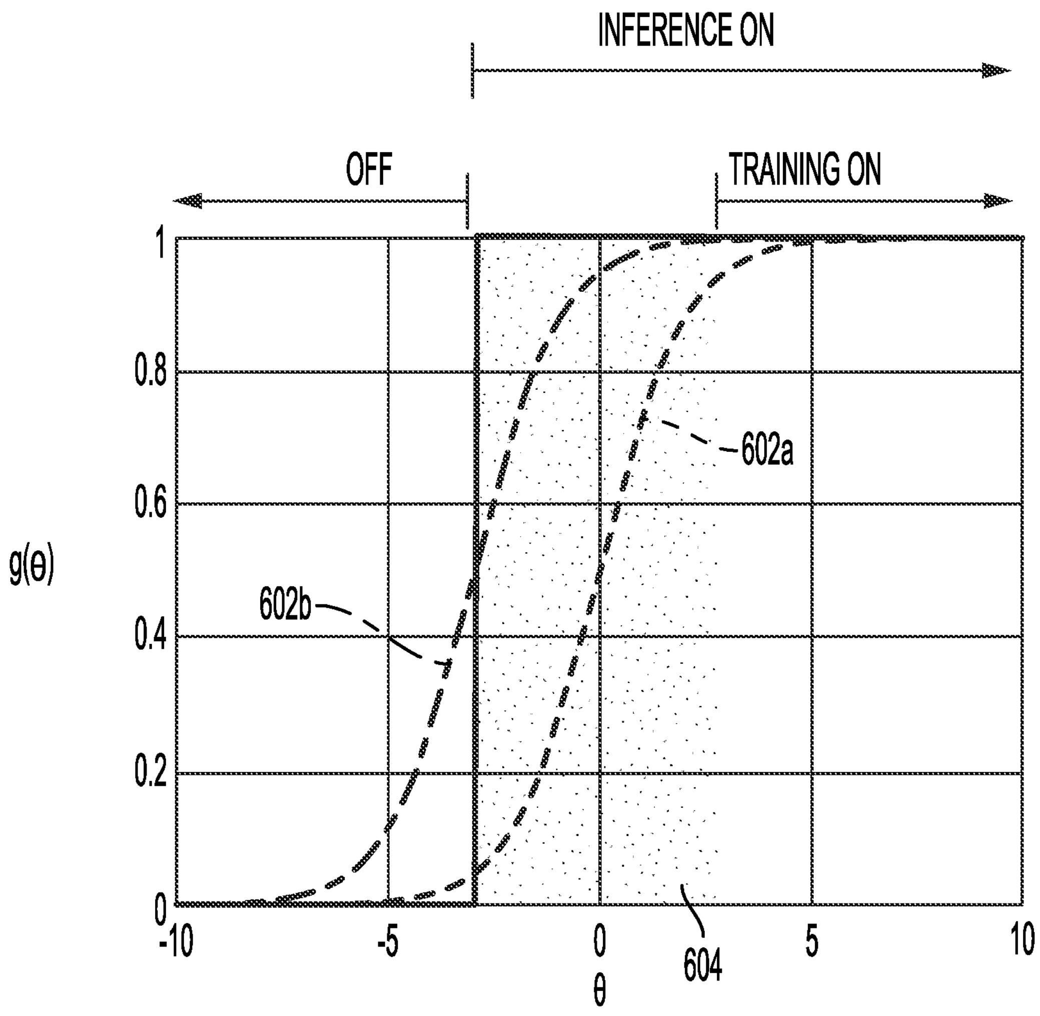
FIG. 6 is a graph of an example of defining a loss function to minimize a number of active layers in a generic algorithm or in a layered belief propagation (LBP) algorithm, in accordance with aspects of the present disclosure.

FIG. 6 illustrates an example of defining a loss function to minimize the number of active layers in a layered belief propagation (LBP) algorithm, in accordance with aspects of the present disclosure. Θ in the range (−3, 3), shown as 604 in FIG. 6, is typically sub-optimal and to be avoided, since, for such Θ, the corresponding layer is still active during inference, despite the optimizer indicating that the corresponding layer can be at least somewhat attenuated with minimal accuracy loss. Such Θ can be conceptualized as the optimizer indicating some remaining ambiguity about whether the layer should be skipped; it may be preferable for the optimizer to unambiguously indicate either that the layer should definitely be skipped (e.g., $\Theta<-3$) or definitely active (e.g., $\Theta>3$). Referring to FIG. 6, the shift by three in Equation 16 (shown by way of a shift in waveform 602*a* to 602*b*) ensures that layers with $\Theta[t,l] \geq -3$ are effectively penalized, as these layers are not skipped during inference. In practice, this shift relative to the training gating function in Equation 12 may result in an optimized $\Theta[t,l]$, which are mostly outside of the range (−3, 3), as $\Theta[t,l]$ in (−3, 3) hurt accuracy by attenuating the corresponding messages in Process 5, and thus produce high losses in both Equations 14 and 16. Thus, ambiguity about whether a layer should be active or skipped, which would result from Θ[t,l] in (−3, 3), as indicated by region 604, may be substantially reduced, and in some aspects, completely eliminated, by using a cost function which adequately penalizes such values of Θ[t,l], such as the cost function of Equation 16 (see also Equation 4).

In some aspects, the accuracy and the number of active layers may be simultaneously optimized using a weighted sum of the loss functions of Equations 14 and 16 as the total loss function to optimize, given by:

$$\mathcal{L} = \lambda_{acc} \times \mathcal{L}_{acc} + \lambda_{active} \times \mathcal{L}_{active}, \tag{17}$$

where $\lambda_{acc}$ is a scaling factor set to normalize $\mathcal{L}_{acc}$ relative to $\mathcal{L}_{active}$ when $\lambda_{active}=1$ and all layers are active. On the other hand, $\lambda_{active}$ is a hyperparameter allowing for different tradeoffs between the number of active layers (e.g., decoding time) and accuracy. The factor $\lambda_{acc}$ may ensure that the two components of Equation 17 are comparable when all layers are active and $\lambda_{active}=1$, thus implying that the second term in Equation 17 is given by T×|C|/Z. For a given LDPC code, $\lambda_{acc}$ may be derived with all layers active and with LLRs generated using a signal-to-noise ratio (SNR) corresponding to an average codeword error rate (CWER) of, for example, 0.1, by calculating the resulting $\mathcal{L}_{acc}$, which may be referred to as $$\mathcal{L}_{acc}^{0}.$$

Accordingly, $\lambda_{acc}$ is then given by:

$$\lambda_{acc} = \frac{T \times |C|/Z}{\mathcal{L}_{acc}^{0}} = \frac{1}{\mathcal{L}_{acc}^{0}} \times \frac{N-K}{Z} \times T, \tag{18}$$

so that when all layers are active, $\lambda_{active}=1$, and $$\mathcal{L}_{acc} = \mathcal{L}_{acc}^{0},$$

the two components of the loss function of Equation 17 are equal.

Furthermore, to produce an optimized schedule for a given LDPC code, training examples may be generated by adding random Gaussian noise vectors to the all-zero codeword, such that the resulting SNR is in a waterfall region of the LDPC code (with all layers active). The all-zero codeword may be used for all training examples due to the symmetry property of the layered belief-propagation algorithm. Process 5 may be implemented as a model, for example in TensorFlow, with differentiable gating function g(θ) given, for example, by Equation 12. Conventional optimization techniques, for example leveraging a machine learning framework such as TensorFlow, may be used to find the optimal parameters Θ[t,l], which minimize the loss function of Equation 17. Inference operations (e.g., decoding) may be performed using Process 6 and a binary-valued gating function g(θ), such as that of Equation 13, with the optimized Θ[t,l] from training, to indicate which layers may be optimally skipped with minimal performance loss.

Schedules may be trained using the exact sum-product scan formulation of Equation 8, or they may be trained using an approximation to Equation 8 such as, for example, offset min-sum (OMS). Regardless of the scan formulation used during training, the optimized schedules can be used in an inference engine using any scan formulation, including, for example, the exact formulation of Equation 8, or any approximation of Equation 8, such as, for example, OMS.

As indicated above, FIGS. 1-6 are provided as examples. Other examples may differ from what is described with respect to FIGS. 1-6.

Figure 7:
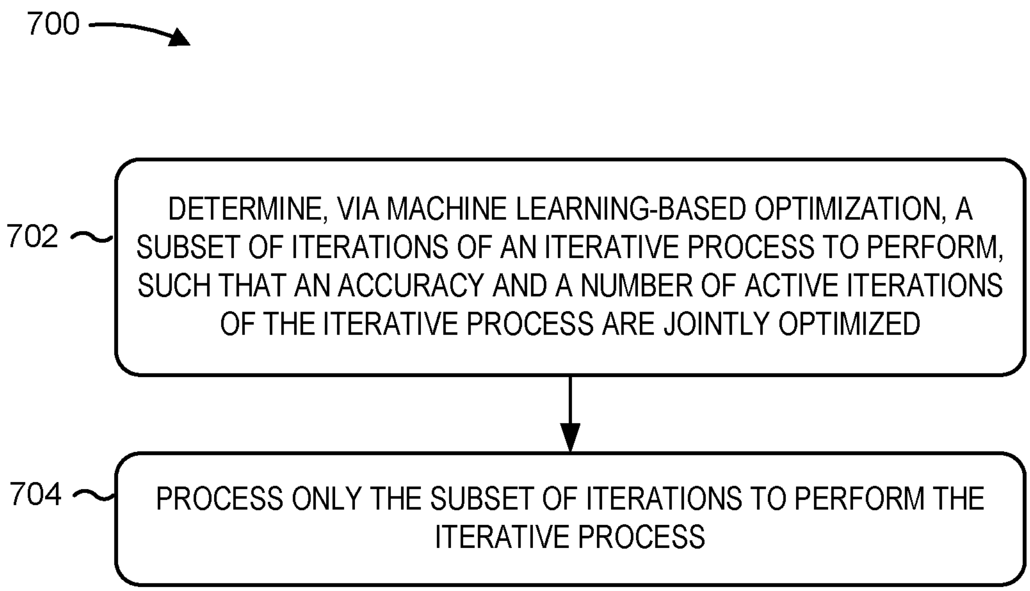
FIGS. 7-9 are flow diagrams illustrating example processes performed, for example, by a processor, in accordance with various aspects of the present disclosure.

FIG. 7 is a flow diagram illustrating an example process 700 performed, for example, by a processor, in accordance with various aspects of the present disclosure. The process 700 is an example of optimizing an iterative process using machine learning-based optimization. At block 702, the process determines, via machine learning-based optimization, a subset of iterations of the iterative process to perform. The subset of iterations is determined such that an accuracy and a number of active iterations of the iterative process are jointly optimized.

At block 704, the process 700 processes only the subset of iterations to perform the iterative process.

Figure 8:
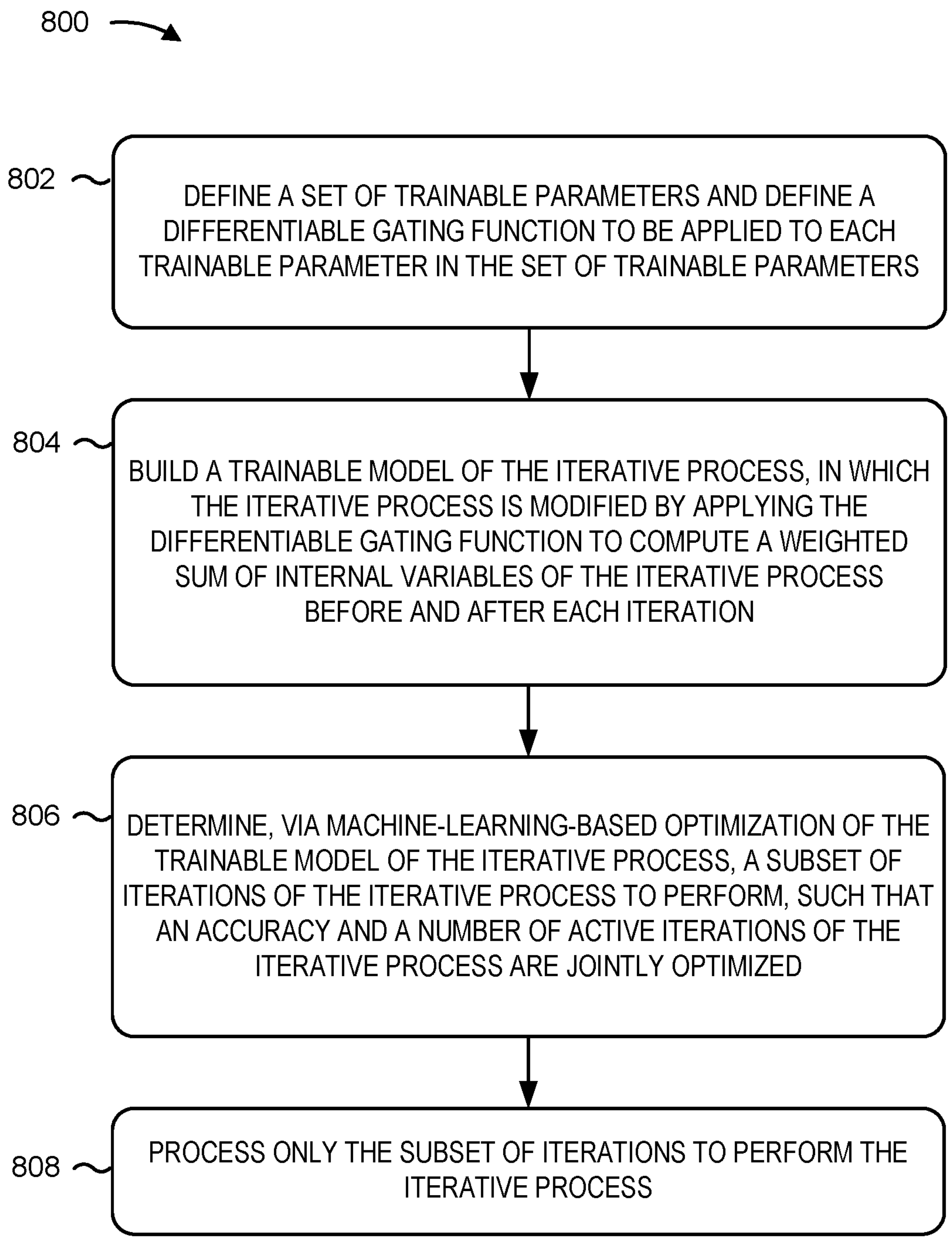

FIG. 8 is a flow diagram illustrating an example process 800 performed via processor, in accordance with various aspects of the present disclosure. The process 800 is an example of optimizing an iterative process using machine learning. At block 802, the process defines a set of trainable parameters Θ and defines a differentiable gating function g(θ) to be applied to each trainable parameter in the set of trainable parameters Θ.

At block 804, the process 800 builds a trainable model of an iterative process (e.g., as described in Process 2) in which the iterative process is modified by using the differentiable gating function g(Θ) to compute a weighted sum of the iterative process' internal variables before and after each iteration (e.g., as in line 4 of Process 2).

At block 806, the process 800 determines, via machine learning-based optimization of the trainable model of the iterative process, a subset of iterations of the iterative process to perform. The subset of iterations is determined such that an accuracy and a number of active iterations of the iterative process are jointly optimized.

At block 808, the process 800 processes only the subset of iterations to perform the iterative process.

Figure 9:
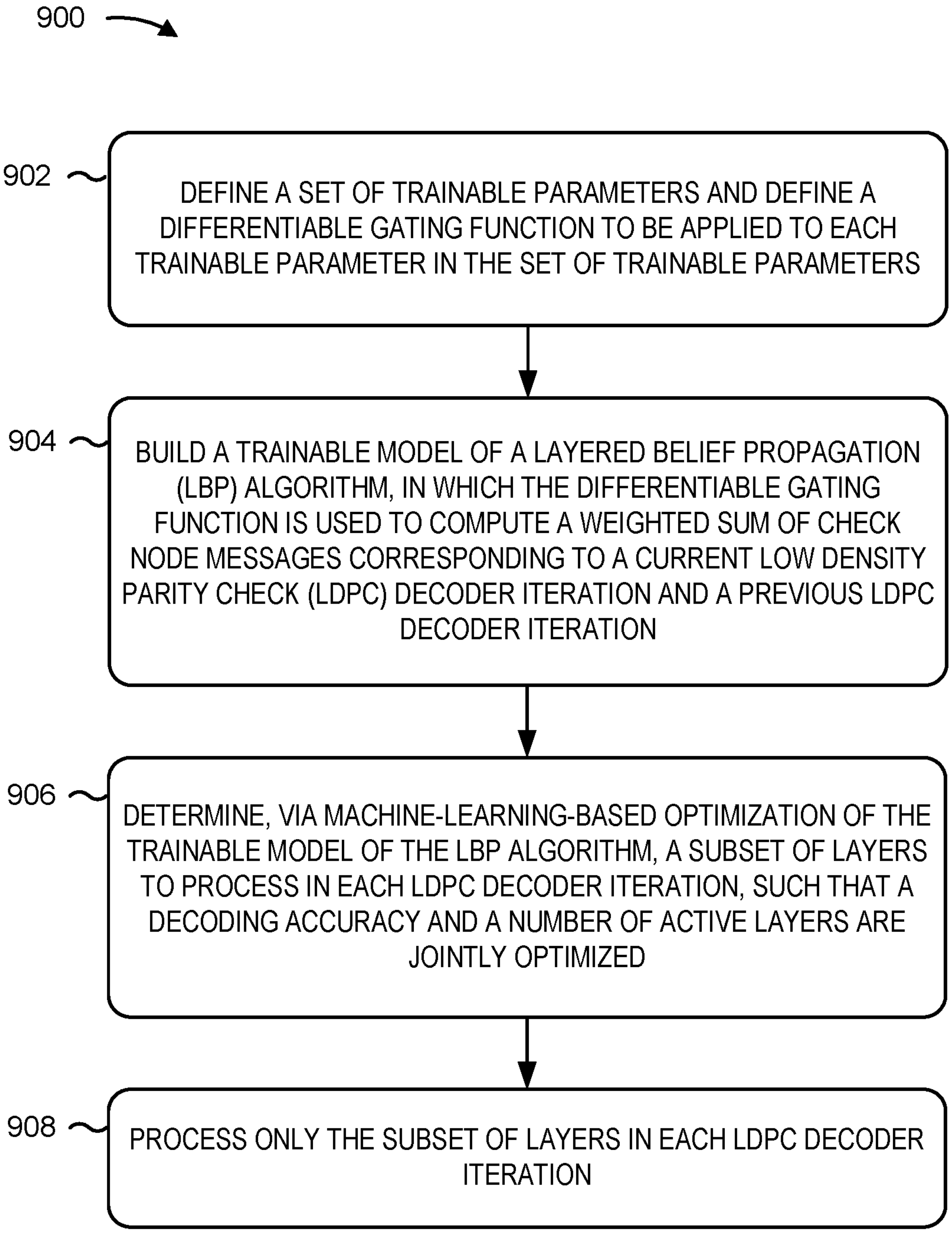

FIG. 9 is a flow diagram illustrating an example process 900 performed in accordance with various aspects of the present disclosure. The process 900 is an example of optimizing the layered belief propagation algorithm for low density parity check (LDPC) decoding using machine learning. At block 902, the process defines a set of trainable parameters Θ and a differentiable gating function g(θ) to be applied to each trainable parameter in the set of trainable parameters Θ.

At block 904, the process 900 builds a trainable model of the layered belief propagation (LBP) algorithm for decoding LDPC codewords. The differentiable gating function g(Θ) is used to compute a weighted sum of check node messages corresponding to a current LDPC decoder iteration and a previous LDPC decoder iteration (e.g., as in line 14 of Process 5).

At block 906, the process 900 determines, via machine learning-based optimization of the trainable model of the LBP algorithm, a subset of layers to process in each LDPC decoder iteration, such that a decoding accuracy and a number of active layers are jointly optimized.

At block 908, the process 900 processes only the optimized subset of layers in each LDPC decoder iteration.

Implementation examples are provided in the following numbered clauses.

1. A method of optimizing an iterative process, comprising:
   - defining a set of trainable parameters and defining a differentiable gating function to be applied to each trainable parameter in the set of trainable parameters;
   - building a trainable model of the iterative process, in which the iterative process is modified by using a value of the differentiable gating function applied to the trainable parameters to compute a weighted sum of internal variables of the iterative process before and after each iteration;
   - determining, via machine learning-based optimization of the trainable model of the iterative process, a subset of iterations of the iterative process to perform, such that an accuracy and a number of active iterations of the iterative process are jointly optimized; and
   - processing only the subset of iterations to perform the iterative process.

2. The method of clause 1, in which determining comprises jointly minimizing the number of active iterations and a loss of accuracy.

3. The method of clause 1 or 2, in which minimizing the number of active iterations comprises optimizing a function of trainable parameters based on a weighted sum of a loss function related to the number of active iterations and an accuracy loss function.

4. The method of any of clauses 1-3, in which the loss function related to the number of active iterations comprises a sum of differentiable functions of the trainable parameters.

5. The method of any of clauses 1-4, in which the differentiable functions of the trainable parameters are given by a shifted sigmoid function.

6. The method of any of clauses 1-5, further comprising setting a scaling hyper-parameter to control a tradeoff between decoding speed and decoding accuracy.

7. The method of any of clauses 1-6, comprising setting a scaling factor to normalize the loss function related to the number of active iterations and the accuracy loss function.

8. The method of any of clauses 1-7, in which the iterative process includes one or more nested loops, the trainable parameters may be indexed by all loop variables such that the determined subset of iterations is adjustable to include or exclude iterations at an arbitrary level of nesting.

9. The method of any of clauses 1-8, in which the differentiable gating function is given by a sigmoid function.

10. The method of any of clauses 1-9, in which the building includes computing a weighted sum using a value of the differentiable gating function of the trainable parameters for a given iteration T to assign relative weights to values of internal variables before and after the iteration T.

11. The method of any of clauses 1-10, where the weights are computed by applying the differentiable gating function to the trainable parameters corresponding to the given iteration T.

12. The method of any of clauses 1-11, in which the processing comprises skipping at least one iteration of the subset of iterations, based on values of a trained set of parameters Θ.

13. The method of any of clauses 1-12, in which a binary-valued function g(Θ) is applied to each of the values of the trained set of parameters Θ to determine whether a corresponding iteration is active or skipped.

14. The method of any of clauses 1-13, in which the binary-valued function g(Θ) is given by a shifted unit step function, so that an iteration of the subset of iterations is active whenever its corresponding Θ is above a threshold, and skipped whenever its corresponding Θ is below the threshold.

15. The method of any of clauses 1-15, in which the iterative process comprises a layered belief propagation (LBP) algorithm for decoding low density parity check (LDPC) codes, where the LBP algorithm is an iterative algorithm in which the inner-most iterations are layers and further comprising:
   - determining, via machine learning-based optimization of a trainable model of the LBP algorithm, a subset of layers to process in each LDPC decoder iteration, such that a decoding accuracy and a number of active layers are jointly optimized; and
   - processing only the determined subset of layers in each outer-most iteration of the LBP algorithm for LDPC decoding.

16. The methods of any of clauses 1-15, where training is accelerated by implementing a model of the LBP algorithm using 3-D Tensors, where one dimension is given by a lifting factor Z to increase parallelization.

17. The method of any of clauses 1-16, in which the trainable model and parameters are used to optimize the iterative process by:
   - determining, via a machine learning-based optimization, the subset of iterations of the iterative process to perform, such that the accuracy and the number of active iterations of the iterative process are jointly optimized; and
   - processing only the subset of iterations to perform the iterative process.

18. An apparatus of optimizing an iterative process, comprising:
   - a memory; and
   - at least one processor coupled to the memory, the at least one processor being configured:
   - to define a set of trainable parameters and defining a differentiable gating function to be applied to each trainable parameter in the set of trainable parameters;
   - to build a trainable model of the iterative process, in which the iterative process is modified by using a value of the differentiable gating function applied to the trainable parameters to compute a weighted sum of internal variables of the iterative process before and after each iteration;
   - to determine, via machine learning-based optimization of the trainable model of the iterative process, a subset of iterations of the iterative process to perform, such that an accuracy and a number of active iterations of the iterative process are jointly optimized; and
   - to process only the subset of iterations to perform the iterative process.

19. The apparatus of clause 18, in which the at least one processor is further configured to optimize a function of trainable parameters based on a weighted sum of a loss function related to the number of active iterations and an accuracy loss function.

20. The apparatus of clause 18 or 19, in which the loss function related to the number of active iterations comprises a sum of differentiable functions of the trainable parameters.

21. The apparatus of any of clauses 18-20, in which the differentiable functions of the trainable parameters are given by a shifted sigmoid function.

22. The apparatus of any of clauses 18-21, in which the at least one processor is further configured to set a scaling hyper-parameter to control a tradeoff between decoding speed and decoding accuracy.

23. The apparatus of any of clauses 18-22, in which the at least one processor is further configured to set a scaling factor to normalize the loss function related to the number of active iterations and the accuracy loss function.

24. The apparatus of any of clauses 18-23, in which the iterative process includes one or more nested loops, the trainable parameters may be indexed by all loop variables such that the determined subset of iterations is adjustable to include or exclude iterations at an arbitrary level of nesting.

25. The apparatus of any of clauses 18-24, in which the differentiable gating function is given by a sigmoid function.

26. An apparatus for optimizing a layered belief propagation (LBP) algorithm for low density parity check (LDPC) decoding, comprising:

a memory; and at least one processor coupled to the memory, the at least one processor being configured:

to define a set of trainable parameters and defining a differentiable gating function to be applied to each trainable parameter in the set of trainable parameters;

build a trainable model of the LBP algorithm, in which the differentiable gating function applied to the trainable parameters is used to compute a weighted sum of check node messages corresponding to a current LDPC decoder iteration and a previous LDPC decoder iteration;

to determine, via machine learning-based optimization of the trainable model of the LBP algorithm, a subset of layers to process in each LDPC decoder iteration, such that a decoding accuracy and a number of active layers are jointly optimized; and to process only the subset of layers in each LDPC decoder iteration.

27. An apparatus for optimizing an iterative process, comprising:

means for defining a set of trainable parameters and defining a differentiable gating function to be applied to each trainable parameter in the set of trainable parameters;

means for building a trainable model of the iterative process, in which the iterative process is modified by using a value of the differentiable gating function applied to the trainable parameters to compute a weighted sum of internal variables of the iterative process before and after each iteration;

means for determining, via machine learning-based optimization of the trainable model of the iterative process, a subset of iterations of the iterative process to perform, such that an accuracy and a number of active iterations of the iterative process are jointly optimized; and means for processing only the subset of iterations to perform the iterative process.

28. The apparatus of clause 27, in which the iterative process is a layered belief propagation (LBP) algorithm for low density parity check (LDPC) decoding and further comprising:

means for determining, via machine learning-based optimization of the trainable model of the LBP algorithm, a subset of layers to process in each LDPC decoder iteration, such that a decoding accuracy and a number of active layers are jointly optimized; and means for processing only the subset of layers in each LDPC decoder iteration.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set", "group", and "collection" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of optimizing an iterative process, comprising:

defining a set of trainable parameters and defining a differentiable gating function to be applied to each trainable parameter in the set of trainable parameters;

building a trainable model of the iterative process, in which the iterative process is modified by using a value of the differentiable gating function applied to the set of trainable parameters to compute a weighted sum of internal variables of the iterative process before and after each iteration;

determining, via machine learning-based optimization of the trainable model of the iterative process, an updated set of trainable parameters, such that an accuracy and a number of active iterations of the iterative process are jointly optimized;

determining at least one iteration of the iterative process to skip during inference based on an importance metric computed as a function of the updated set of trainable parameters; and processing an input by performing only a subset of iterations in the trainable model to generate an inference, wherein the subset of iterations excludes the at least one iteration of the iterative process to skip during inference with minimal accuracy loss.

2. The method of claim 1, in which determining comprises jointly minimizing the number of active iterations and a loss of accuracy.

3. The method of claim 2, in which minimizing the number of active iterations comprises optimizing a function of the set of trainable parameters based on a weighted sum of a loss function related to the number of active iterations and an accuracy loss function.

4. The method of claim 3, in which the loss function related to the number of active iterations comprises a sum of differentiable functions of the set of trainable parameters.

5. The method of claim 4, in which the differentiable functions of the set of trainable parameters are given by a shifted sigmoid function.

6. The method of claim 3, further comprising setting a scaling hyper-parameter to control a tradeoff between decoding speed and decoding accuracy.

7. The method of claim 3, comprising setting a scaling factor to normalize the loss function related to the number of active iterations and the accuracy loss function.

8. The method of claim 1, in which the iterative process includes one or more nested loops, the set of trainable parameters indexed by all loop variables such that the subset of iterations is adjustable to include or exclude iterations at an arbitrary level of nesting.

9. The method of claim 1, in which the differentiable gating function is given by a sigmoid function.

10. The method of claim 1, in which the building includes computing a weighted sum using a value of the differentiable gating function of the set of trainable parameters for a given iteration T to assign relative weights to values of internal variables before and after the iteration T.

11. The method of claim 10, where the weights are computed by applying the differentiable gating function to the set of trainable parameters corresponding to the given iteration T.

12. The method of claim 1, in which the processing comprises skipping at least one iteration of the subset of iterations, based on values of a trained set of parameters $\Theta$.

13. The method of claim 12, in which a binary-valued function $g(\Theta)$ is applied to each of the values of the trained set of parameters $\Theta$ to determine whether a corresponding iteration is active or skipped.

14. The method of claim 13, in which the binary-valued function $g(\Theta)$ is given by a shifted unit step function, so that an iteration of the subset of iterations is active when its corresponding $\Theta$ is above a threshold, and the at least one iteration is skipped when its corresponding $\Theta$ is below the threshold.

15. The method of claim 1, in which the iterative process comprises a layered belief propagation (LBP) process for decoding low density parity check (LDPC) codes, where the LBP process is an iterative process in which the inner-most iterations are layers and the method further comprises:

determining, via machine learning-based optimization of a trainable model of the LBP process, a subset of layers to process in each LDPC decoder iteration, such that a decoding accuracy and a number of active layers are jointly optimized; and processing only the determined subset of layers in each outer-most iteration of the LBP process for LDPC decoding.

16. The methods of claim 15, where training is accelerated by implementing a model of the LBP process using three dimensional (3-D) Tensors, where one dimension is given by a lifting factor Z to increase parallelization.

17. An apparatus of optimizing an iterative process, comprising:

at least one memory; and at least one processor coupled to the at least one memory, the at least one processor being configured to:

define a set of trainable parameters and define a differentiable gating function to be applied to each trainable parameter in the set of trainable parameters;

build a trainable model of the iterative process, in which the iterative process is modified by using a value of the differentiable gating function applied to the set of trainable parameters to compute a weighted sum of internal variables of the iterative process before and after each iteration;

determine, via a machine learning-based optimization of the trainable model of the iterative process, an updated set of trainable parameters, such that an accuracy and a number of active iterations of the iterative process are jointly optimized;

determine at least one iteration of the iterative process to skip during inference based on an importance metric computed as a function of the updated set of trainable parameters; and process an input by performing only a subset of iterations in the trainable model to generate an inference, wherein the subset of iterations excludes the at least one iteration of the iterative process to skip during inference with minimal accuracy loss.

18. The apparatus of claim 17, in which the at least one processor is further configured to optimize a function of the set of trainable parameters based on a weighted sum of a loss function related to the number of active iterations and an accuracy loss function.

19. The apparatus of claim 18, in which the loss function related to the number of active iterations comprises a sum of differentiable functions of trainable parameters of the set of trainable parameters.

20. The apparatus of claim 19, in which the differentiable functions of the set of trainable parameters are given by a shifted sigmoid function.

21. The apparatus of claim 18, in which the at least one processor is further configured to set a scaling hyper-parameter to control a tradeoff between decoding speed and decoding accuracy.

22. The apparatus of claim 18, in which the at least one processor is further configured to set a scaling factor to normalize the loss function related to the number of active iterations and the accuracy loss function.

23. The apparatus of claim 17, in which the iterative process includes one or more nested loops, the set of trainable parameters being indexed by all loop variables such that the determined subset of iterations is adjustable to include or exclude iterations at an arbitrary level of nesting.

24. The apparatus of claim 17, in which the differentiable gating function is given by a sigmoid function.

25. An apparatus for optimizing a layered belief propagation (LBP) process for low density parity check (LDPC) decoding, comprising:
at least one memory; and
at least one processor coupled to the at least one memory, the at least one processor being configured to:
define a set of trainable parameters and define a differentiable gating function to be applied to each trainable parameter in the set of trainable parameters;
build a trainable model of the LBP process, in which the differentiable gating function applied to the set of trainable parameters is used to compute a weighted sum of check node messages corresponding to a current LDPC decoder iteration and a previous LDPC decoder iteration;
determine, via machine learning-based optimization of the trainable model of the LBP process, an updated set of trainable parameters such that a decoding accuracy and a number of active layers are jointly optimized;
determine at least one LDPC decoder iteration of the LBP process to skip during inference based on an importance metric computed as a function of the updated set of trainable parameters; and
process an input by performing only a subset of layers in each LDPC decoder iteration, wherein the subset of layers excludes the at least one LDPC decoder iteration of the LBP process to skip during inference with minimal accuracy loss.

26. A hardware apparatus for optimizing an iterative process, comprising:
means for defining a set of trainable parameters and defining a differentiable gating function to be applied to each trainable parameter in the set of trainable parameters;
means for building a trainable model of the iterative process, in which the iterative process is modified by using a value of the differentiable gating function applied to the set of trainable parameters to compute a weighted sum of internal variables of the iterative process before and after each iteration;
means for determining, via a machine learning-based optimization of the trainable model of the iterative process, an updated set of trainable parameters, such that an accuracy and a number of active iterations of the iterative process are jointly optimized;
means for determining at least one iteration of the iterative process to skip during inference based on an importance metric computed as a function of the updated set of trainable parameters; and
means for processing an input by performing only a subset of iterations in the trainable model to generate an inference, wherein the subset of iterations excludes the at least one iteration of the iterative process to skip during inference with minimal accuracy loss.

27. The hardware apparatus of claim 26, in which the iterative process is a layered belief propagation (LBP) process for low density parity check (LDPC) decoding and the hardware apparatus further comprises:
means for determining, via machine learning-based optimization of the trainable model of the LBP process, a subset of layers to process in each LDPC decoder iteration, such that a decoding accuracy and a number of active layers are jointly optimized; and
means for processing only the subset of layers in each LDPC decoder iteration.

* * * * *